United States Patent
Sakai et al.

(10) Patent No.: US 7,228,213 B2
(45) Date of Patent: Jun. 5, 2007

(54) VEHICLE ENVIRONMENT CONTROL DEVICE

(75) Inventors: Naoki Sakai, Kobe (JP); Yoshihiko Maeno, Kobe (JP); Yasushi Seike, Kobe (JP); Satoru Kishimoto, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 21 days.

(21) Appl. No.: 10/838,339

(22) Filed: May 5, 2004

(65) Prior Publication Data

US 2004/0225419 A1   Nov. 11, 2004

(30) Foreign Application Priority Data

May 8, 2003   (JP) .............................. 2003-129953

(51) Int. Cl.
*G06F 17/00* (2006.01)

(52) U.S. Cl. ........................................................ 701/49
(58) Field of Classification Search ...................... None
See application file for complete search history.

(56) References Cited

U.S. PATENT DOCUMENTS

| | | | | | |
|---|---|---|---|---|---|
| 5,529,372 | A | * | 6/1996 | Cohen | 297/217.3 |
| 5,712,625 | A | * | 1/1998 | Murphy | 340/5.22 |
| 6,100,811 | A | * | 8/2000 | Hsu et al. | 340/5.83 |
| 6,282,475 | B1 | * | 8/2001 | Washington | 701/49 |
| 6,505,780 | B1 | * | 1/2003 | Yassin et al. | 235/492 |
| 6,690,260 | B1 | * | 2/2004 | Ashihara | 340/5.8 |
| 6,724,920 | B1 | * | 4/2004 | Berenz et al. | 382/118 |
| 6,732,035 | B2 | * | 5/2004 | Miller et al. | 701/49 |
| 6,810,309 | B2 | * | 10/2004 | Sadler et al. | 701/1 |
| 2002/0197976 | A1 | * | 12/2002 | Liu et al. | 455/352 |
| 2003/0086588 | A1 | * | 5/2003 | Shinada et al. | 382/104 |
| 2003/0209893 | A1 | * | 11/2003 | Breed et al. | 280/735 |

FOREIGN PATENT DOCUMENTS

| | | | |
|---|---|---|---|
| EP | 0870654 A2 | * | 10/1998 |
| JP | 11-072559 | | 3/1999 |
| JP | 11-083997 | | 3/1999 |

* cited by examiner

*Primary Examiner*—Michael J. Zanelli
(74) *Attorney, Agent, or Firm*—Wenderoth, Lind & Ponack, L.L.P.

(57) ABSTRACT

A vehicle environment control device for recognizing and controlling the state of vehicle-associated equipment and a vehicle environment has a personal data storage section for storing user's personal data associated with users of the vehicle M, a fingerprint information storage section for storing information about fingerprints of authorized users thereof, a section for identifying a user based on fingerprint information, a section for reading personal data (such as a physique) of the identified user thereof from the personal data storage section and a section for setting the vehicle M to be an environment suitable for the user (such as setting a seat position) based on the read personal data, resulting in improved convenience of a driver or occupants in using a vehicle.

1 Claim, 25 Drawing Sheets

Fig.2

| ID No. | Height | Weight | Sitting Height | Reach | Suspension | Shifting |
|---|---|---|---|---|---|---|
| 1 | 180 | 70 | 100 | 60 | Stiff | Hard |
| 2 | 160 | 50 | 85 | 50 | Supple | Mild |
| | | | | | | |

Fig.11

| Data No. | Name | Address | Position (Area) | Initial Fee | Time before Additional Fee ($\Delta t$) | Fee / $\Delta t$ |
|---|---|---|---|---|---|---|
| 001 | AA Car Park | XXX, Chuo-ku, Osaka-shi | $x_1, y_1$ | 250 Yen | 30 Minutes | 250 Yen |
| 002 | BB Parking Lot | YYY, Chuo-ku, Osaka-shi | $x_2, y_2$ | 100 Yen | 15 Minutes | 100 Yen |
| 003 | CC Parking Lot | ZZZ, Kita-ku, Osaka-shi | $x_{31}, y_{31}$ — $x_{32}, y_{32}$ | 150 Yen | 20 Minutes | 150 Yen |

VEHICLE ENVIRONMENT CONTROL DEVICE

BACKGROUND OF THE INVENTION

1. Field of the Invention

The present invention relates to a vehicle environment control device and, more particularly, to a vehicle environment control device for improving the convenience of a driver or occupants in using a vehicle.

2. Description of the Relevant Art

As systems for assisting driving of a vehicle and the like, a system wherein the distance between one's vehicle and the vehicle ahead, the relative velocity thereof and the like are measured, so that a safe distance therebetween is kept based on those measurements (see Japanese Kokai No. 1999-72559 and No. 1999-83997, for example), a lane-keeping assistance system, a collision avoidance system and the like have been proposed.

These between-vehicle distance control system, lane-keeping assistance system, collision avoidance system and the like are extremely useful for securing safety during driving a vehicle.

But, it is important not only to secure safety during driving a vehicle, but also to improve the convenience of a driver or occupants in using a vehicle. As a system for improving the convenience, a keyless entry system is exemplified, wherein locking/unlocking of doors can be conducted by remote control. However, in the present circumstances, not so many systems for improving the convenience of a driver or occupants in using a vehicle have been proposed.

SUMMARY OF THE INVENTION

The present invention was accomplished in order to solve the above problem, and it is an object of the present invention to provide a vehicle environment control device for improving the convenience of a driver or occupants in using a vehicle.

In order to achieve the above object, a vehicle environment control device according to the first aspect of the present invention is characterized by being a vehicle environment control device for recognizing and controlling the state of vehicle-associated equipment and a vehicle environment, comprising a personal data storage section for storing personal data of a user of the vehicle associated with the user, a user identification section for identifying the user, a personal data reading section for reading the personal data of the user of the vehicle from the personal data storage section based on the identification result by the user identification section and a vehicle environment setting section for setting the vehicle to be an environment suitable for the identified user based on the personal data read by the personal data reading section.

Using the vehicle environment control device according to the first aspect of the present invention, the vehicle is automatically set to be an environment suitable for the user thereof based on the personal data (such as a physique and preferences) of the user of the vehicle. For example, based on the height, sitting height, reach and the like of the user, the positions of a seat, a brake pedal, mirrors (the angle thereof) and a steering wheel (the length and angle of a steering post) can be set, or based on the height, weight and the like thereof, the expanding force of an air bag (weak for a small person, while strong for a large-built person) can be set. And based on the preferences or personality of the user, the stiffness of a suspension and the timing of shifting (earlier timing of shifting for a person who likes hard acceleration) can be selected. As a result, it is possible to improve the convenience of a driver in using a vehicle.

A vehicle environment control device according to the second aspect of the present invention is characterized by the vehicle environment set by the vehicle environment setting section which includes at least one from among the positions of a seat, a brake pedal, mirrors and a steering wheel, the expanding force of an air bag, the stiffness of a suspension and the timing of shifting in the vehicle environment control device according to the first aspect of the present invention.

Using the vehicle environment control device according to the second aspect of the present invention, at least one from among the positions of the seat, brake pedal, mirrors and steering wheel, the expanding force of the air bag, the stiffness of the suspension and the timing of shifting is automatically set to be suitable for the user of the vehicle. By setting the positions of the seat, brake pedal, mirrors and steering wheel, the stiffness of the suspension and the timing of shifting to be suitable for the user of the vehicle, it is possible to make the environment during driving comfortable. Moreover, by setting the expanding force of the air bag to be suitable for the user, it is possible to improve safety.

A vehicle environment control device according to the third aspect of the present invention is characterized by being a vehicle environment control device for recognizing and controlling the state of vehicle-associated equipment and a vehicle environment, comprising a pictorial data transmitting section for transmitting pictorial data obtained from a picture-taking unit for taking pictures of the inside of the vehicle to a first prescribed destination using a communication section when a first predetermined condition is met.

Using the vehicle environment control device according to the third aspect of the present invention, pictorial data obtained by taking pictures of the inside of the vehicle is transmitted to the first prescribed destination using the communication section, so that the pictorial data can be transmitted to a portable phone or the like being carried by the driver of the vehicle who is away from the vehicle. Thus, even if the driver is away from the vehicle, it is possible to confirm how a child or an animal left inside the vehicle has been therein or the presence or absence of an article left behind therein, or to find an intruder into the vehicle.

A vehicle environment control device according to the fourth aspect of the present invention is characterized by comprising an object movement judgment section for judging whether or not there is a movement of an object inside the vehicle based on pictorial data obtained from the picture-taking unit, wherein the first predetermined condition includes that it is judged that there is a movement of an object inside the vehicle by the object movement judgment section in the vehicle environment control device according to the third aspect of the present invention.

As described above, by sending pictorial data obtained by taking pictures of the inside of the vehicle to the first prescribed destination (for example, a portable phone being carried by the driver of the vehicle), an effect that it is possible to know the state of the inside of the vehicle even if the driver is away from the vehicle is shown. But if the pictorial data is frequently transmitted, the amount of power consumption increases and the communication cost becomes higher. And the transmission in the case of no occupant or no animal being inside the vehicle is useless because the situation of the inside of the vehicle does not change as long as there is no intruder into the vehicle.

Using the vehicle environment control device according to the fourth aspect of the present invention, since the condition for transmitting the pictorial data to the first prescribed destination includes that it is judged that there is a movement of an object inside the vehicle (for example, an intruder into the vehicle is detected), the pictorial data can be transmitted thereto only when required. Thus, it is possible to prevent the amount of power consumption form increasing or the communication cost from becoming higher, and to reduce the frequency of useless transmission.

A vehicle environment control device according to the fifth aspect of the present invention is characterized by comprising a transmission request presence judgment section for judging whether or not there is a transmission request of the pictorial data from the outside of the vehicle, wherein the first predetermined condition includes that it is judged that the transmission request was made by the transmission request presence judgment section in the vehicle environment control device according to the third aspect of the present invention.

Using the vehicle environment control device according to the fifth aspect of the present invention, since the condition for transmitting the pictorial data to the first prescribed destination includes that it is judged that there was a transmission request of the pictorial data from the outside of the vehicle, the pictorial data can be transmitted thereto only when required. Thus, it is possible to prevent the amount of power consumption from increasing or the communication cost from becoming higher, and to reduce the frequency of useless transmission.

A vehicle environment control device according to the sixth aspect of the present invention is characterized by being a vehicle environment control device for recognizing and controlling the state of vehicle-associated equipment and a vehicle environment, comprising a keeping space storage section for storing positional information concerning a keeping space for the vehicle, an opening request signal transmitting section for transmitting an opening request signal to a keeping space opening device installed at the keeping space when a second predetermined condition is met, and a vehicle position judgment section for judging whether or not the vehicle is in the vicinity of the keeping space based on positional information of the vehicle and the positional information concerning the keeping space stored in the keeping space storage section, wherein the second predetermined condition includes that it is judged that the vehicle is in the vicinity of the keeping space by the vehicle position judgment section.

Using the vehicle environment control device according to the sixth aspect of the present invention, when the second predetermined condition is met, the opening request signal is transmitted to the keeping space opening device (such as a device for raising a shutter of a garage) and the keeping space is opened by the keeping space opening device (for example, the shutter of the garage is raised). And the second predetermined condition includes that it is judged that the vehicle is in the vicinity of the keeping space by the vehicle position judgment section.

Thus, when the vehicle is in the vicinity of the keeping space (e.g. when the vehicle reached the front of the garage), the shutter of the garage is automatically raised. Therefore, since the driver does not have to perform an operation for raising the shutter, the driver can garage the vehicle without loss of time.

A vehicle environment control device according to the seventh aspect of the present invention is characterized by comprising a vehicle approaching judgment section for judging whether or not the vehicle approached the keeping space, wherein the second predetermined condition includes that it is judged that the vehicle approached the keeping space by the vehicle approaching judgment section in the vehicle environment control device according to the sixth aspect of the present invention.

Using the vehicle environment control device according to the seventh aspect of the present invention, since the second predetermined condition (or the condition for transmitting the opening request signal to the keeping space opening device) includes that it is judged that the vehicle approached the keeping space by the vehicle approaching judgment section, the opening request signal can be transmitted only when the vehicle came back to the garage. Or it is possible not to transmit the opening request signal when the vehicle leaves the garage.

A vehicle environment control device according to the eighth aspect of the present invention is characterized by being a vehicle environment control device for recognizing and controlling the state of vehicle-associated equipment and a vehicle environment, comprising a room temperature judgment section for judging whether or not the temperature inside the vehicle reached a prescribed temperature based on temperature data obtained from a temperature measuring unit for measuring the room temperature of the vehicle, and a temperature condition transmitting section for transmitting information indicating that the temperature inside the vehicle reached the prescribed temperature to a second prescribed destination using a communication section when it is judged that the temperature inside the vehicle reached the prescribed temperature by the room temperature judgment section.

Using the vehicle environment control device according to the eighth aspect of the present invention, the room temperature of the vehicle reached the prescribed temperature (such as a temperature suitable for the season), the information showing the effect is transmitted to the second prescribed destination using the communication section. Therefore, for example, it is possible to transmit the information to a portable phone or the like being carried by the driver of the vehicle who is away from the vehicle.

Thus, the driver can be informed of that the room temperature of the vehicle became a suitable one in a distant place from the vehicle, so that the driver can get on the vehicle after it became a comfortable temperature if an air conditioner of the vehicle can be operated by remote control, for example.

A vehicle environment control device according to the ninth aspect of the present invention is characterized by being a vehicle environment control device for recognizing and controlling the state of vehicle-associated equipment and a vehicle environment, comprising a fee information storage section for storing fee information required for calculating a parking fee for a parking lot, a parking start time determination section for determining when the parking of the vehicle was started in the parking lot, a parking situation calculation section for finding a parking situation related to the parking fee based on the parking start time determined by the parking start time determination section and the fee information stored in the fee information storage section, and a parking situation transmitting section for transmitting information showing the parking situation calculated by the parking situation calculation section to a third prescribed destination using a communication section.

Using the vehicle environment control device according to the ninth aspect of the present invention, the parking situation related to the parking fee (for example, the parking fee is now 1000 yen because of an elapse of two hours after the parking was started, or 300 yen will be added to the parking fee 5 minutes later) is found based on the parking start time in the parking lot and the fee information required for calculating the parking fee for the parking lot, and the obtained information showing the parking situation is transmitted to the third prescribed destination using the communication section. Therefore, for example, it is possible to transmit the information to a portable phone or the like being carried by the driver of the vehicle who is away from the vehicle. Thus, the driver can grasp the parking situation related to the parking fee in a place distant from the vehicle.

A vehicle environment control device according to the tenth aspect of the present invention is characterized by comprising a first transmission timing decision section for deciding the transmission timing of the information showing the parking situation based on the timing with which an additional fee is added to the parking fee, wherein the parking situation transmitting section transmits the information with the transmission timing decided by the first transmission timing decision section in the vehicle environment control device according to the ninth aspect of the present invention.

As described above, by sending the information showing the parking situation related to the parking fee to the third prescribed destination (for example, a portable phone being carried by the driver of the vehicle), an effect that it is possible to grasp the parking situation even if the driver is away from the vehicle is shown. But when the information is frequently transmitted, the amount of power consumption increases and the communication cost becomes higher. And a large amount of information confuses the driver.

Using the vehicle environment control device according to the tenth aspect of the present invention, the transmission timing of the information showing the parking situation is decided based on the timing with which an additional fee is added to the parking fee and with the timing, the information is transmitted. For example, a few minutes before an addition to the fee is decided as the transmission timing of the information. Thus, it is naturally possible to prevent the amount of power consumption from increasing or the communication cost from becoming higher, and moreover, it is possible to let the driver know about an addition to the fee with the appropriate timing.

A vehicle environment control device according to the eleventh aspect of the present invention is characterized by comprising a second transmission timing decision section for deciding the transmission timing of the information showing the parking situation based on the parking fee, wherein the parking situation transmitting section transmits the information with the transmission timing decided by the second transmission timing decision section in the vehicle environment control device according to the ninth aspect of the present invention.

Using the vehicle environment control device according to the eleventh aspect of the present invention, the transmission timing of the information showing the parking situation is decided based on the parking fee, and with the timing, the information is transmitted. For example, several minutes before the parking fee exceeds a given amount of money (for example, an estimate of the driver) is decided as the transmission timing of the information. Thus, it is naturally possible to prevent the amount of power consumption from increasing or the communication cost from becoming higher, and moreover, it is possible to let the driver know that the parking fee will exceed the estimate soon with the appropriate timing.

A vehicle environment control device according to the twelfth aspect of the present invention is characterized by comprising a pay parking lot storage section for storing positional information about a pay parking lot, wherein the parking start time determination section recognizes the start of parking of the vehicle in the pay parking lot and determines the parking start time of the vehicle in the pay parking lot based on positional information of the vehicle and the positional information of the pay parking lot stored in the pay parking lot storage section in any of the vehicle environment control devices according to the ninth through eleventh aspects of the present invention.

Using the vehicle environment control device according to the twelfth aspect of the present invention, the start of parking of the vehicle in the pay parking lot is recognized and furthermore, the parking start time of the vehicle is determined based on the positional information of the vehicle and the positional information of the pay parking lot. Therefore, the driver himself/herself needs to input neither the start of the parking in the pay parking lot nor when the parking was started, so that a very user-friendly device can be realized.

A vehicle environment control device according to the thirteenth aspect of the present invention is characterized by being a vehicle environment control device for recognizing and controlling the state of vehicle-associated equipment and a vehicle environment, comprising a first noxious gas detector for detecting a noxious gas content inside the vehicle and a ventilation section for ventilating the room of the vehicle in response to the noxious gas content inside the vehicle based on data obtained by the first noxious gas detector.

Using the vehicle environment control device according to the thirteenth aspect of the present invention, since the ventilation is conducted in response to the noxious gas (such as carbon monoxide, nitrogen oxides or hydrocarbon) content inside the vehicle, it is possible to automatically ventilate the room thereof when the noxious gas content inside the room thereof becomes higher, for example.

A vehicle environment control device according to the fourteenth aspect of the present invention is characterized by being a vehicle environment control device for recognizing and controlling the state of vehicle-associated equipment and a vehicle environment, comprising a second noxious gas detector for detecting a noxious gas content outside the vehicle, a noxious gas content judgment section for judging whether or not the noxious gas content outside the vehicle is a prescribed content or more based on data obtained from the second noxious gas detector, and an engine stop section for stopping an engine of the vehicle when a third prescribed condition is met, wherein the third prescribed condition includes that it is judged that the noxious gas content outside the vehicle is the prescribed content or more by the noxious gas content judgment section and that the vehicle is in an idling state.

Recently, an accident happened, wherein a vehicle was left in an idling state inside a garage of its user's house for a long period of time, so that the house was filled with a noxious carbon-monoxide gas, resulting in deaths of persons staying at home.

The vehicle environment control device according to the fourteenth aspect of the present invention has the engine stop section for stopping the engine of the vehicle when the third predetermined condition is met. And the third predetermined condition includes that it is judged that the amount of noxious gas (such as carbon monoxide, nitrogen oxides or hydrocarbon) contained outside the vehicle is the prescribed amount or more by the noxious gas content judgment section and that the vehicle is in the idling state.

Thus, for example, even if the vehicle is left in the idling state within a garage of the user's house for a long period of time, the engine of the vehicle can be automatically stopped with increased noxious gas, so that it is possible to prevent noxious gas from filling the house.

A vehicle environment control device according to the fifteenth aspect of the present invention is characterized by being a vehicle environment control device for recognizing and controlling the state of vehicle-associated equipment and a vehicle environment, comprising a quiet place judgment section for judging whether or not the vehicle is in a quiet place, and a sound reducing section for reducing the volume of a sound such as a horn sound generated from the vehicle when it is judged that the vehicle is in a quiet place by the quiet place judgment section.

Using the vehicle environment control device according to the fifteenth aspect of the present invention, if it is judged that the vehicle is in a quiet place by the quiet place judgment section, the volume of a sound (such as a horn sound) generated from the vehicle is reduced. Thus, it is possible to prevent causing annoyance with a big horn sound. Here, as a method for reducing a horn sound, a method is exemplified, wherein a power supply to a horn sound generator is restricted.

A vehicle environment control device according to the sixteenth aspect of the present invention is characterized by the quiet place judgment section which judges whether or not the vehicle is in a quiet place based on information obtained from an illuminance measurement unit for measuring the illuminance outside the vehicle in the vehicle environment control device according to the fifteenth aspect of the present invention.

Basically, the nighttime is quieter than the daytime, and a dark place is quieter than a well-lighted place. Using the vehicle environment control device according to the sixteenth aspect of the present invention, whether or not the vehicle is in a quiet place is judged based on the information obtained from the illuminance measurement unit for measuring the illuminance outside the vehicle, so that it is possible to reduce the volume of a sound such as a horn sound generated from the vehicle in an appropriate place.

Here, as a method for judging whether or not the vehicle is in a quiet place, the noise level outside the vehicle, time information, and travel area information obtained from a navigation system besides the illuminance outside the vehicle can be exemplified. For example, when the noise level is not more than a prescribed level, or when the present time is between 11 p.m. and 6 a.m., or when the vehicle is far from an urban area, it is possible to judge that the vehicle is in a quiet place.

A vehicle environment control device according to the seventeenth aspect of the present invention is characterized by being a vehicle environment control device for recognizing and controlling the state of vehicle-associated equipment and a vehicle environment, comprising an obstacle distance calculation section for finding the distance from an obstacle present in a lateral direction of a lower portion of the vehicle based on information obtained from a side monitoring unit for monitoring the side of the lower portion of the vehicle, and a processing section for conducting a predetermined processing based on the distance from the obstacle calculated by the obstacle distance calculation section.

Using the vehicle environment control device according to the seventeenth aspect of the present invention, the distance from an obstacle (such as a road shoulder) present in a lateral direction of the lower portion of the vehicle is found, and based on the distance from the obstacle, the predetermined processing (such as sounding a beep, outputting a message "A wheel will be damaged." or braking) is conducted, so that it is possible to let the driver know that there is a risk that a wheel will be damaged, or to stop the vehicle. Thus, it is possible to avoid a hazardous event of contact of the vehicle with a road shoulder or the like.

A vehicle environment control device according to the eighteenth aspect of the present invention is characterized by being a vehicle environment control device for recognizing and controlling the state of vehicle-associated equipment and a vehicle environment, comprising a service information storage section for storing information to be provided to each person associated with each person, an occupant identification section for identifying an occupant of the vehicle, a service information reading section for reading information to be provided to the occupant identified by the occupant identification section from the service information storage section, and a providing section for providing the information read by the service information reading section to the occupant.

Using the vehicle environment control device according to the eighteenth aspect of the present invention, the occupant of the vehicle is identified, the information to be provided to the identified occupant is read out, and the information to be provided to the occupant is provided to the occupant. Therefore, for example, when information regarding a schedule and information regarding received mails sent to his/her mail address are stored as service information to be provided to the occupant in the service information storage section, those items of information can be provided to the occupant. As a result, a device acting as secretary can be realized. Here, as a method for acquiring service information to be provided to an occupant, a method is exemplified, wherein information is acquired from the outside sources through a communication unit so that the acquired information may be stored in the service information storage section.

A vehicle environment control device according to the nineteenth aspect of the present invention is characterized by being a vehicle environment control device for recognizing and controlling the state of vehicle-associated equipment and a vehicle environment, comprising a switching signal outputting section for outputting a signal instructing to switch between locking and unlocking of a child lock to a child lock controller based on a signal transmitted through an operation of a touch panel having changed operating screens.

Using the vehicle environment control device according to the nineteenth aspect of the present invention, since it is possible to provide an instruction to switch between locking and unlocking of the child lock by operating the touch panel mounted on a navigation system or the like, it becomes easy to switch between the locking and unlocking of the child lock.

Moreover, since the operating screen of the touch panel is changed (for example, it has a hierarchical structure or the like), its operation is not difficult for adults (adults are rather accustomed to using that) but not so easy for children (particularly for infants). As a result, it is possible to prevent children from switching between the locking and unlocking of the child lock, so that not only convenience but also safety can be secured.

BRIEF DESCRIPTION OF THE DRAWINGS

FIG. 2 is a table showing an example of personal data of authorized users of a vehicle stored in a personal data storage section of the vehicle environment control device according to the first embodiment;

FIG. 11 is a table showing an example of positional information of each pay parking lot and fee information thereof required for calculating a parking fee stored in a parking lot information storage section of the vehicle environment control device according to the fifth embodiment;

DESCRIPTION OF THE PREFERRED EMBODIMENTS

Figure 1:
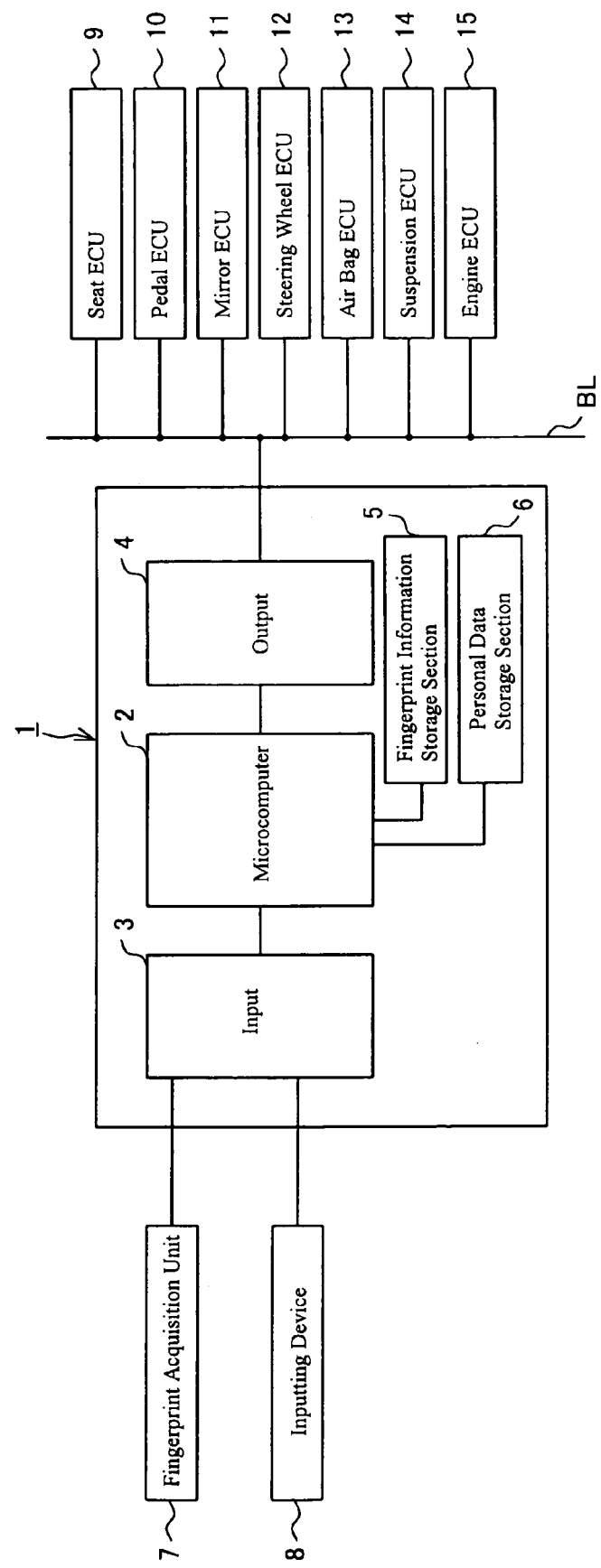
FIG. 1 is a block diagram schematically showing the principal part of a vehicle environment control system comprising a vehicle environment control device according to a first embodiment of the present invention.

The preferred embodiments of the vehicle environment control device according to the present invention are described below by reference to the Figures of the drawings. FIG. 1 is a block diagram schematically showing the principal part of a vehicle environment control system comprising a vehicle environment control device according to a first embodiment.

Reference numeral 1 in the figure represents a vehicle environment control device, comprising a microcomputer 2, an input processing section 3, an output processing section 4, a fingerprint information storage section 5 for storing information regarding a fingerprint of an authorized user of a vehicle (hereinafter, referred to as the vehicle M) corresponding to each identification number and a personal data storage section 6 for storing personal data (such as information about a physique) of the authorized users of the vehicle M.

To the input processing section 3, a fingerprint acquisition unit 7 for acquiring a fingerprint of a person desiring to use the vehicle M and an inputting device 8 for inputting personal data of the authorized users of the vehicle M are connected, while to the output processing section 4, a seat ECU (Electronic Control Unit) 9 for controlling the position of a seat, a pedal ECU 10 for controlling the position of a brake pedal, a mirror ECU 11 for controlling opening/closing of door mirrors or the angle thereof, a steering wheel ECU 12 for controlling the length or angle of a steering post, an air bag ECU 13 for controlling the expansion or expanding force of an air bag, a suspension ECU 14 for controlling the stiffness of a suspension and an engine ECU 15 for controlling an engine are connected through a bus line BL.

Here, each of these ECUs is assigned an individual identification number. The seat ECU 9 has an identification number '01', the pedal ECU 10 has '02', the mirror ECU 11 has '03', the steering wheel ECU 12 has '04', the air bag ECU 13 has '05', the suspension ECU 14 has '06' and the engine ECU 15 has '07'. Each ECU has a function of adjusting the seat position, the brake pedal position or the like based on information included in a signal sent to its own (the destination of the signal can be judged from the identification numbers).

FIG. 2 is a structure of tabulated data showing an example of personal data of authorized users of the vehicle M stored in the personal data storage section 6. Information regarding the 'height', 'weight', 'sitting height', 'reach', 'favorite stiffness of suspension' and 'favorite shifting timing' of the authorized users of the vehicle M corresponding to each identification number has been stored therein. For example, concerning an authorized user having an identification number '1', information that the height, weight, sitting height and reach of the authorized user are 180 cm, 70 kg, 100 cm and 60 cm, respectively, and that he/she likes a rather stiff suspension and earlier shifting timing has been stored therein.

Figure 3:
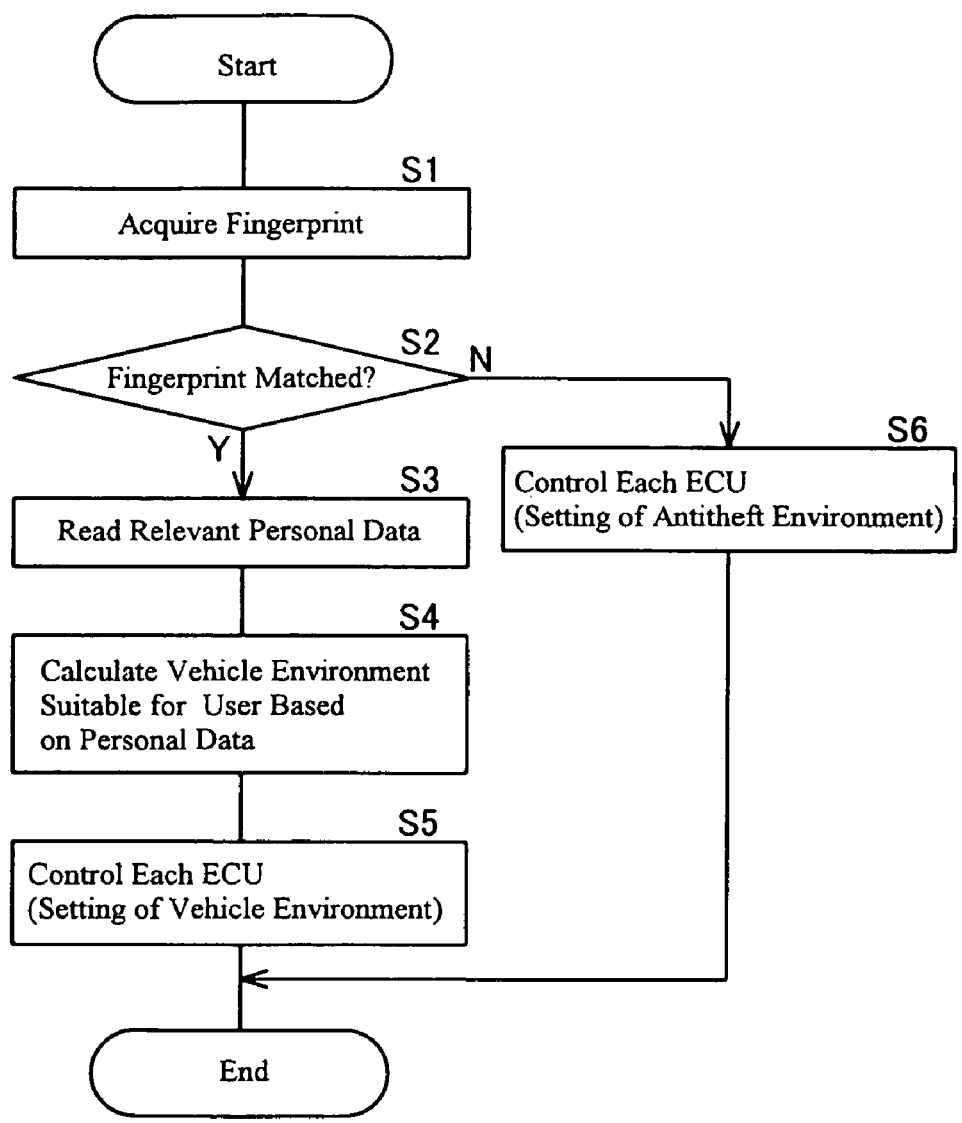
FIG. 3 is a flow chart showing the processing operation performed by a microcomputer in the vehicle environment control device according to the first embodiment.

The processing operation ① performed by the microcomputer 2 in the vehicle environment control device 1 according to the first embodiment is described below by reference to a flow chart shown in FIG. 3. First, information concerning a fingerprint of a person desiring to use the vehicle M is acquired based on information obtained from the fingerprint acquisition unit 7 (Step 1), and whether or not the person desiring to use the vehicle M is an authorized user thereof is judged based on the acquired fingerprint information and the fingerprint information stored in the fingerprint information storage section 5 (Step 2).

When it is judged that the person desiring to use the vehicle M is an authorized user thereof, personal data of the person desiring to use the vehicle M is read from the personal data storage section 6 (Step 3). Based on the read-out personal data, a vehicle environment (such as a seat position) suitable for the person desiring to use the vehicle M is calculated (Step 4).

As the vehicle environment, the positions of the seat, brake pedal, mirrors (the angle thereof) and steering wheel (the length and angle of the steering post), the expanding force of the air bag, the stiffness of the suspension and the timing of shifting are exemplified. The positions of the seat, brake pedal, mirrors and steering wheel suitable for the person desiring to use the vehicle M can be calculated from his/her own height, sitting height, reach and the like, and the expanding force of the air bag suitable for the person desiring to use the vehicle M can be calculated from his/her own height, weight and the like.

After calculating the vehicle environment suitable for the person desiring to use the vehicle M in Step 4, prescribed signals are transmitted to each ECU so as to establish the calculated vehicle environment (Step 5). For example, in order to move the seat position to a position suitable for the person desiring to use the vehicle M, a signal of the identification number '01' with information showing a seat position to be set being added thereto is supplied to the bus line BL. In order to move the brake pedal position to a position suitable for the person desiring to use the vehicle M, a signal of the identification number '02' with information showing a brake pedal position to be set being added thereto is supplied to the bus line BL.

On the other hand, when no identical fingerprint was detected, so that it is judged that the person desiring to use the vehicle M is not an authorized user thereof in Step 2, antitheft signals are transmitted to the seat ECU 9, pedal ECU 10, mirror ECU 11 and steering wheel ECU 12 so as to generate a state of inconvenience for driving the vehicle M (Step 6). For example, the seat is moved to the closest to the front, the backrest portion thereof is tilted toward the front, the opening of the door mirrors is disabled and the steering post is made the longest. Here, in order to implement such state, a function of generating the above situation when receiving the antitheft signal may be imparted to the seat ECU 9, pedal ECU 10 and the like.

Using the vehicle environment control device according to the above first embodiment, the positions of the seat, brake pedal, mirrors (the angle thereof) and steering wheel (the length and angle of the steering post), the expanding force of the air bag, the stiffness of the suspension, the timing of shifting and the like are automatically set to be suitable for the person desiring to use the vehicle M based on the personal data (such as the physique and preferences) of the person desiring to use the vehicle M, resulting in an improvement in convenience of a driver in using a vehicle.

In the, vehicle environment control device according to the above first embodiment, the judgment on whether or not the person desiring to use the vehicle M is an authorized user thereof and the identification of the person desiring to use the vehicle M are conducted based on the fingerprint information, but the judgment and identification are not limited to the use of the fingerprint information. For example, other biometric information such as voice print information or face image information may be used. Or such biometric information may not be necessarily used. For example, a password or the like assigned to each person may be input.

In the vehicle environment control device according to the above first embodiment, the vehicle environment suitable for the person desiring to use the vehicle M is set based on the personal data stored in the personal data storage section 6, but in a vehicle environment control device according to another embodiment, a vehicle environment information storage section for storing information concerning a vehicle environment associated with an authorized user of the vehicle M may be prepared and according to the information stored in the vehicle environment information storage section, the vehicle environment may be set.

It is desired that the inputting device 8 for inputting the personal data of the authorized users of the vehicle M should have a touch panel, a display on which an operating screen is shown or the like. In another embodiment, a microcomputer of a vehicle environment control device and a microcomputer of multimedia equipment having a navigation function and the like mounted on the vehicle M may be connected so that data is exchanged therebetween, so that personal data of authorized users of the vehicle M can be input using the multimedia equipment.

Figure 4:
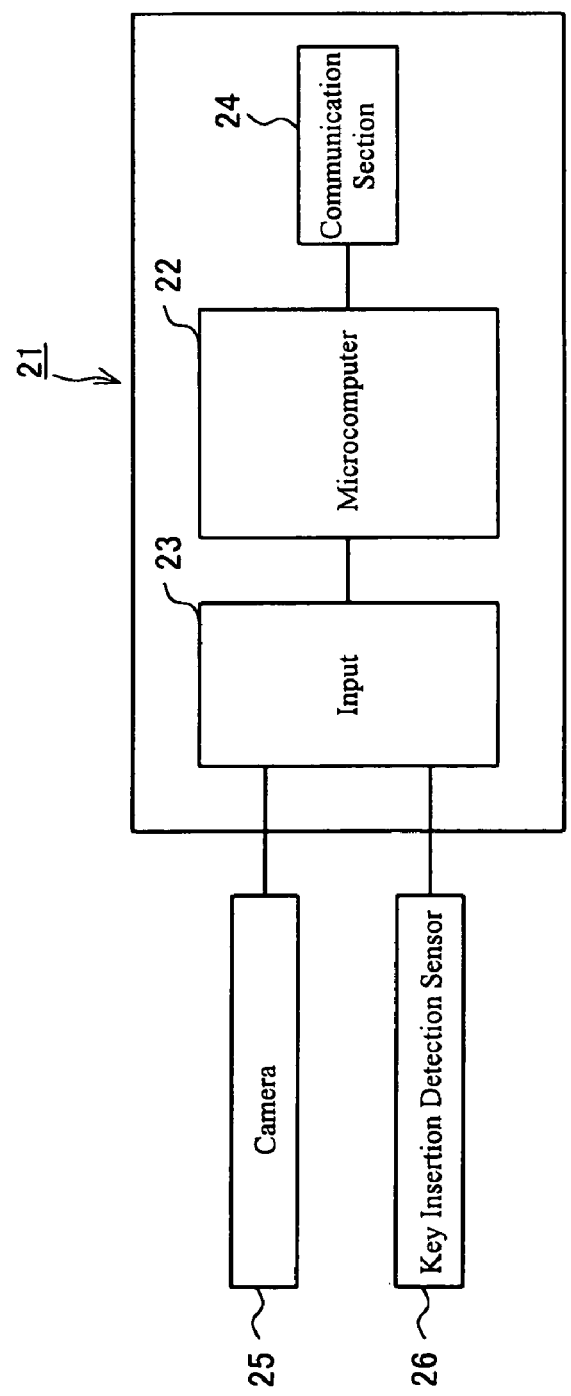
FIG. 4 is a block diagram schematically showing the principal part of a vehicle environment control system comprising a vehicle environment control device according to a second embodiment.

FIG. 4 is a block diagram schematically showing the principal part of a vehicle environment control system comprising a vehicle environment control device according to a second embodiment. Reference numeral 21 in the figure represents a vehicle environment control device, comprising a microcomputer 22, an input processing section 23 and a communication section 24 for transmitting or receiving information to or from the outside of the vehicle M. To the input processing section 23, a camera 25 for taking pictures of the inside of the vehicle M and a key insertion detection sensor 26 for detecting whether or not an ignition key has been inserted in a key cylinder of the vehicle M are connected.

Figure 5:
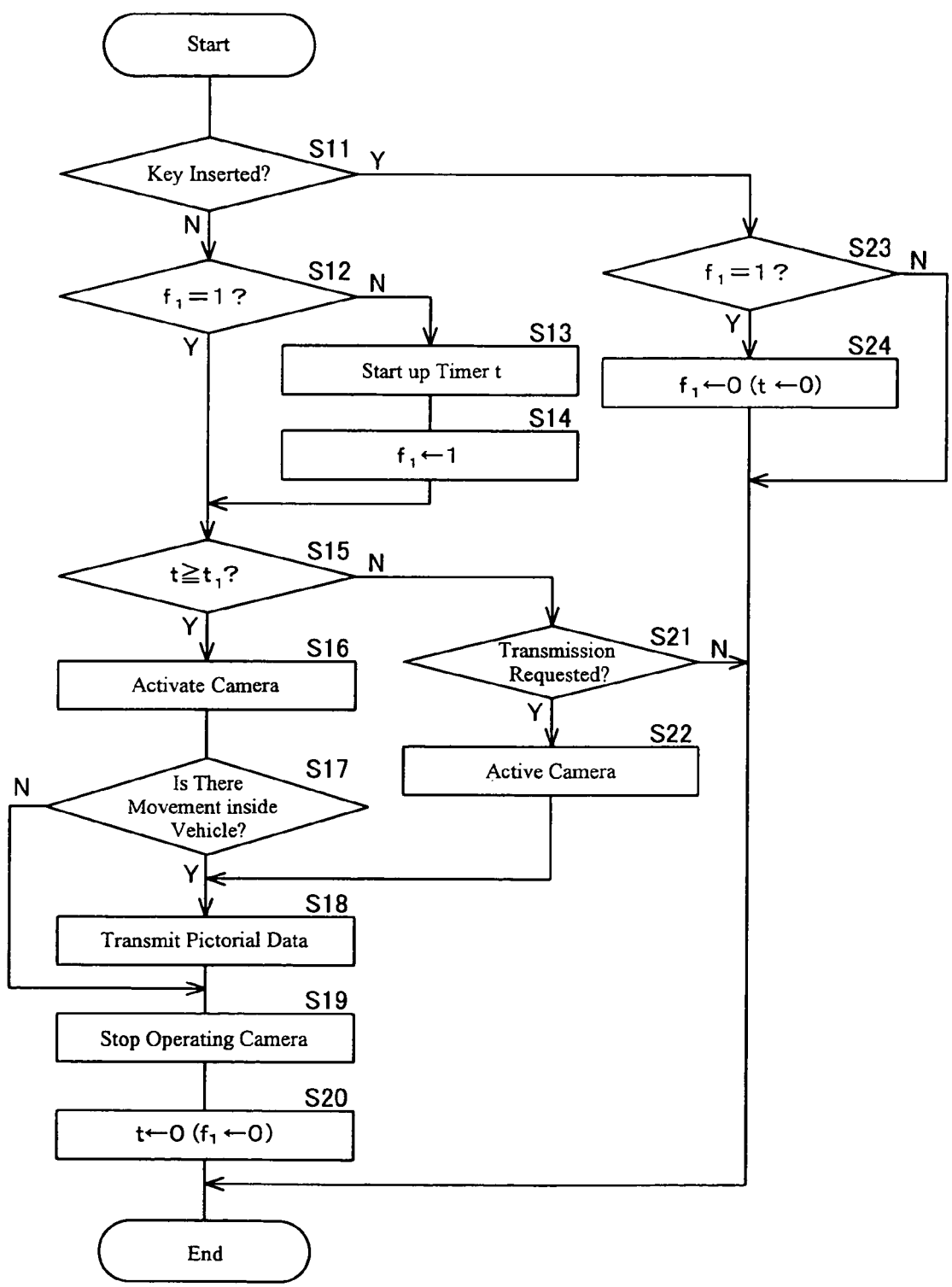
FIG. 5 is a flow chart showing the processing operation performed by a microcomputer in the vehicle environment control device according to the second embodiment.

The processing operation ② performed by the microcomputer 22 in the vehicle environment control device 21 according to the second embodiment is described below by reference to a flow chart shown in FIG. 5. First, whether or not an ignition key has been inserted in the key cylinder is judged based on information obtained from the key insertion detection sensor 26 (Step 11).

When it is judged that no ignition key has been inserted in the key cylinder, it is considered that the driver is away from the vehicle M. Whether a flag $f_1$, which indicates 1 when a timer t has started, is 1 or not is judged (Step 12). When the flag $f_1$ is judged not to be 1, the timer t is set at 0 and is started up (Step 13), the flag $f_1$ is turned to 1 (Step 14), and then, the operation goes to Step 15. On the other hand, when the flag $f_1$ is judged to be 1, it bypasses Steps 13 and 14, and goes directly to Step 15.

Whether or not the timer t has counted to a prescribed time $t_1$ (e.g. 0.1 hour) or more is judged in Step 15. When it is judged that the timer t has counted to the prescribed time $t_1$ or more, the camera 25 is activated and pictorial data taken by the camera 25 is acquired (Step 16). Based on the acquired pictorial data, whether or not some movement is being produced inside the vehicle M is judged (Step 17).

When it is judged that some movement is being produced inside the vehicle M (or there is a possibility that the vehicle M has been in a stolen state), the acquired pictorial data is transmitted to a prescribed destination (such as a portable phone being carried by the driver) using the communication section 24 (Step 18). Thereafter, the camera 25 is stopped operating (Step 19), and the timer t is reset to 0 and the flag $f_1$ is turned to 0 (Step 20).

On the other hand, when it is judged that no movement is being produced inside the vehicle M, it is unnecessary to transmit the pictorial data to the prescribed destination, so that Step 18 is bypassed and the processing to stop the operation of the camera 25 (Step 19) and the processing to reset the timer t to 0 (Step 20) are conducted.

When it is judged that the timer t has counted to less than the prescribed time $t_1$ in Step 15, whether or not a transmission request signal for requesting the transmission of pictorial data sent through the communication section 24 from the outside of the vehicle M was received is judged (Step 21). When it is judged that the transmission request signal was received, the camera 25 is activated and pictorial data taken by the camera 25 is prepared (Step 22). The prepared pictorial data is transmitted to a prescribed destination (such as a portable phone being carried by the driver) using the communication section 24 (Step 18), and then, the camera 25 is stopped operating (Step 19) and the timer t is reset to 0 (Step 20). On the other hand, when it is judged that the transmission request signal has not been received, the processing operation ② is ended at once.

When it is judged that the ignition key has been inserted in the key cylinder in Step 11, it is considered that the driver is on the vehicle M, and whether the flag $f_1$ is 1 or not is judged (Step 23). When the flag $f_1$ is judged to be 1, the flag $f_1$ is returned to 0 and the timer t is reset to 0 (Step 24), and then, the processing operation ② is ended. On the other hand, when it is judged that the flag $f_1$ is not 1 (the timer t is 0), the processing operation ② is ended at once.

Using the vehicle environment control device according to the above second embodiment, when some movement is produced inside the vehicle, or a transmission is requested from the outside, the taken pictorial data of the inside of the vehicle M is transmitted to a portable phone or the like being carried by the driver using the communication section 24. Thus, even if the driver is away from the vehicle M, the driver can confirm the condition of a child or an animal being inside the vehicle M or the presence or absence of an article left behind therein, or find an intruder into the vehicle M. And the camera 25 is operated not at all times, but at intervals of a prescribed period of time $t_1$, or only when a transmission request of pictorial data is received from the driver, resulting in a reduction in power consumption.

Here, as a method for transmitting the pictorial data to the prescribed destination, a method is exemplified, wherein the data is transmitted using a telephone line or the like. Besides, the data may be transmitted using the information network service such as 'G-BOOK' (a registered trademark) developed by Toyota Motor Company.

Figure 6:
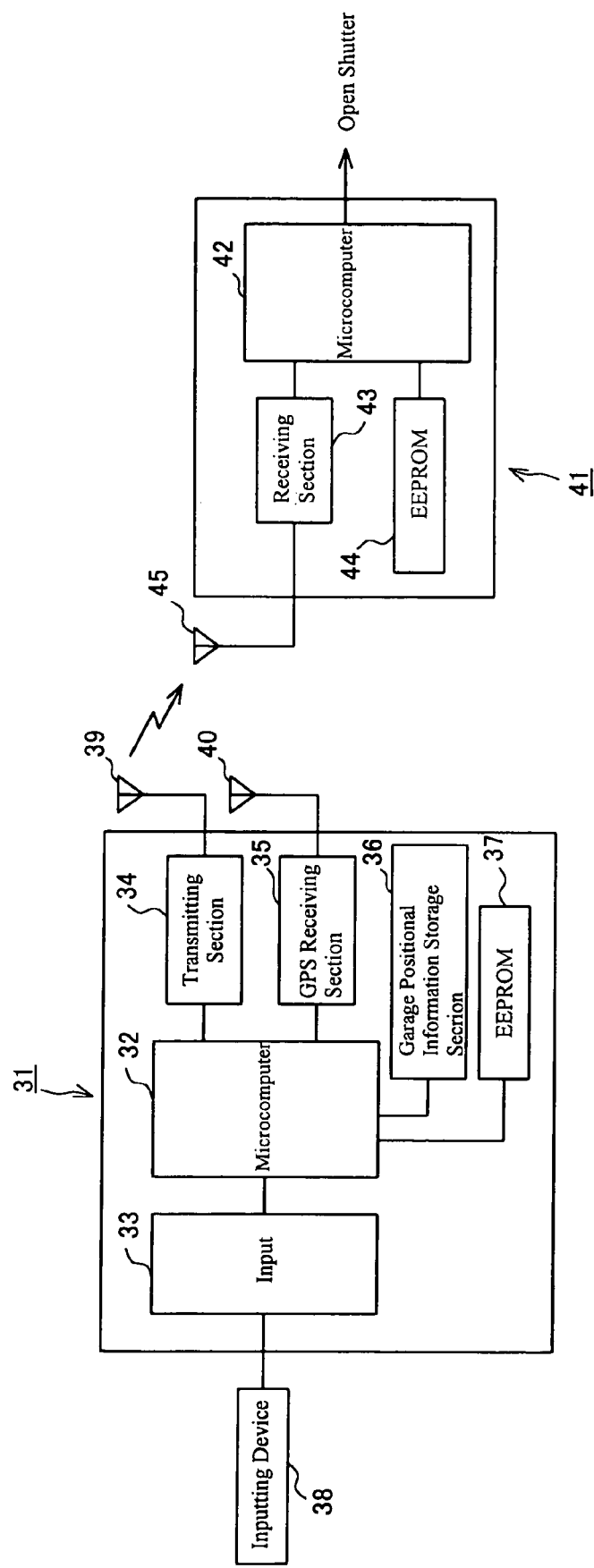
FIG. 6 is a block diagram schematically showing the principal part of a vehicle environment control system comprising a vehicle environment control device according to a third embodiment.

FIG. 6 is a block diagram schematically showing the principal part of a vehicle environment control system comprising a vehicle environment control device according to a third embodiment. Reference numeral 31 in the figure represents a vehicle environment control device, comprising a microcomputer 32, an input processing section 33, a transmitting section 34 for transmitting an opening request signal to a shutter opening device 41 installed close to a garage of the vehicle M, a GPS receiving section 35 for receiving GPS signals from satellites, a garage positional information storage section 36 for storing positional information of the garage and an EEPROM 37 for storing an ID code.

To the input processing section 33, an inputting device 38 used for entering the positional information of the garage into the garage positional information storage section 36 is connected. And antennas 39 and 40 are connected to the transmitting section 34 and the GPS receiving section 35, respectively. When a specific operation is conducted using the inputting device 38, the microcomputer 32 stores positional information of the current position obtained from the GPS receiving section 35 as the garage positional information in the garage positional information storage section 36. As a result, it is possible to store precise positional information of the garage in the garage positional information storage section 36 by conducting this operation when the vehicle M is present in the garage.

The shutter opening device 41 comprises a microcomputer 42, a receiving section 43 for receiving signals such as an opening request signal transmitted from the vehicle environment control device 31 mounted on the vehicle M and an EEPROM 44 in which an ID code identical to the ID code stored in the EEPROM 37 is stored, and an antenna 45 is connected to the receiving section 43.

The microcomputer 42 of the shutter opening device 41 controls a shutter drive unit (not shown) so as to raise the shutter of the garage when receiving a signal of an ID code identical to the code stored in the EEPROM 44 with the opening request signal being added thereto.

Figure 7:
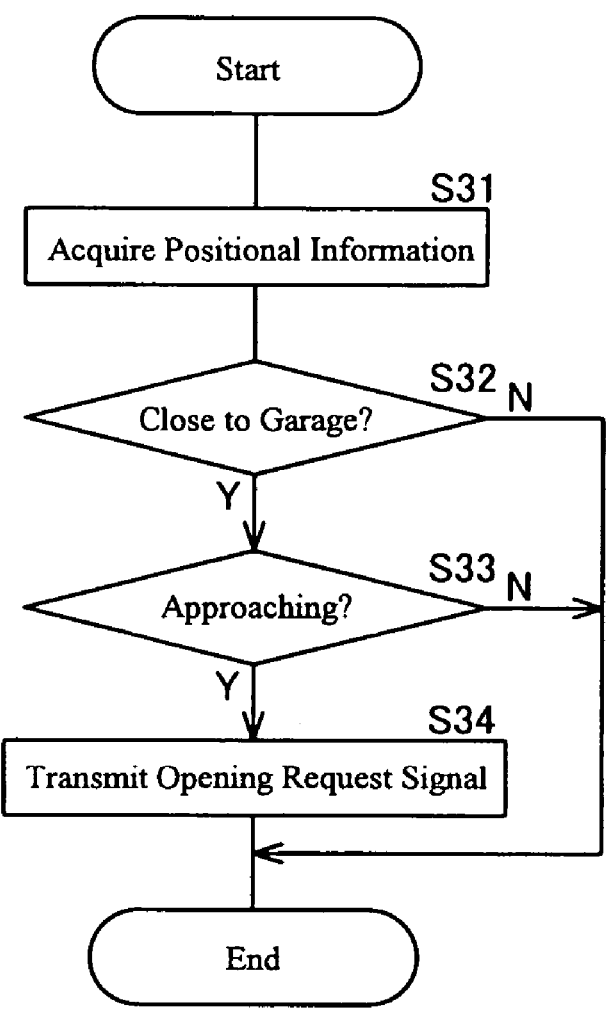
FIG. 7 is a flow chart showing the processing operation performed by a microcomputer in the vehicle environment control device according to the third embodiment.

The processing operation ③ performed by the microcomputer 32 in the vehicle environment control device 31 according to the third embodiment is described below by reference to a flow chart shown in FIG. 7. First, positional information of the current position of the vehicle M is acquired based on information obtained from the GPS receiving section 35 (Step 31). Based on the acquired positional information and the positional information of the garage stored in the garage positional information storage section 36, whether or not the vehicle M is in the vicinity of the garage is judged (Step 32).

When it is judged that the vehicle M is in the vicinity of the garage, whether or not the vehicle M is approaching the garage is judged based on the positional information of the current position of the vehicle M acquired before and the latest positional information of the current position thereof (Step 33). When it is judged that the vehicle M is approaching the garage (or the vehicle M did not leave the garage but is coming back thereto), a signal of the ID code stored in the EEPROM 37 with the opening request signal being added thereto is transmitted using the transmitting section 34 to the shutter opening device 41 (Step 34).

On the other hand, when it is judged that the vehicle M is not in the vicinity of the garage in Step 32, or when it is judged that the vehicle M is not approaching the garage (or just left the garage) in Step 33, the processing operation ③ is ended at once since the shutter need not be raised.

Using the vehicle environment control device according to the above third embodiment, when the vehicle M came back to the garage, the signal of the ID code with the opening request signal being added thereto is transmitted to the shutter opening device 41 installed close to the garage. That can make it unnecessary for the driver to conduct an operation for raising the shutter, and the garaging of the vehicle M can be conducted without loss of time.

It is desired that the inputting device 38 used for entering the positional information of the garage into the garage positional information storage section 36 should have a touch panel, a display on which an operating screen is shown or the like. In another embodiment, a microcomputer of a vehicle environment control device and a microcomputer of multimedia equipment having a navigation function and the like mounted on the vehicle M may be connected so that data can be exchanged therebetween, so that the input operation for entering the positional information of the garage can be conducted using the multimedia equipment.

Figure 8:
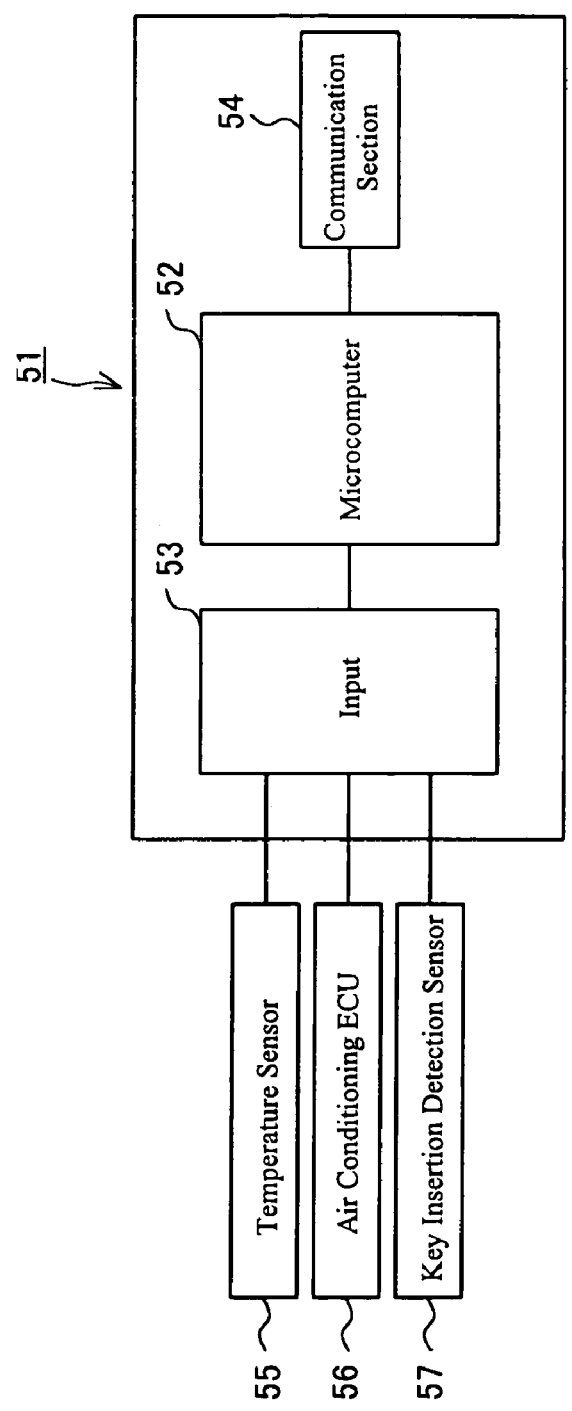
FIG. 8 is a block diagram schematically showing the principal part of a vehicle environment control system comprising a vehicle environment control device according to a fourth embodiment.

FIG. 8 is a block diagram schematically showing the principal part of a vehicle environment control system comprising a vehicle environment control device according to a fourth embodiment. Reference numeral 51 in the figure represents a vehicle environment control device, comprising a microcomputer 52, an input processing section 53 and a communication section 54 for transmitting information to the outside of the vehicle M (such as a portable phone being carried by the driver of the vehicle M).

To the input processing section 53, a temperature sensor 55 for measuring the room temperature of the vehicle M, an air conditioning ECU 56 for controlling an air conditioner, and a key insertion detection sensor 57 for detecting whether or not an ignition key has been inserted in a key cylinder of the vehicle M are connected. Although it is not shown, the air conditioning function is activated by remote control to the air conditioning ECU 56 using a communication unit carried by the driver.

Figure 9:
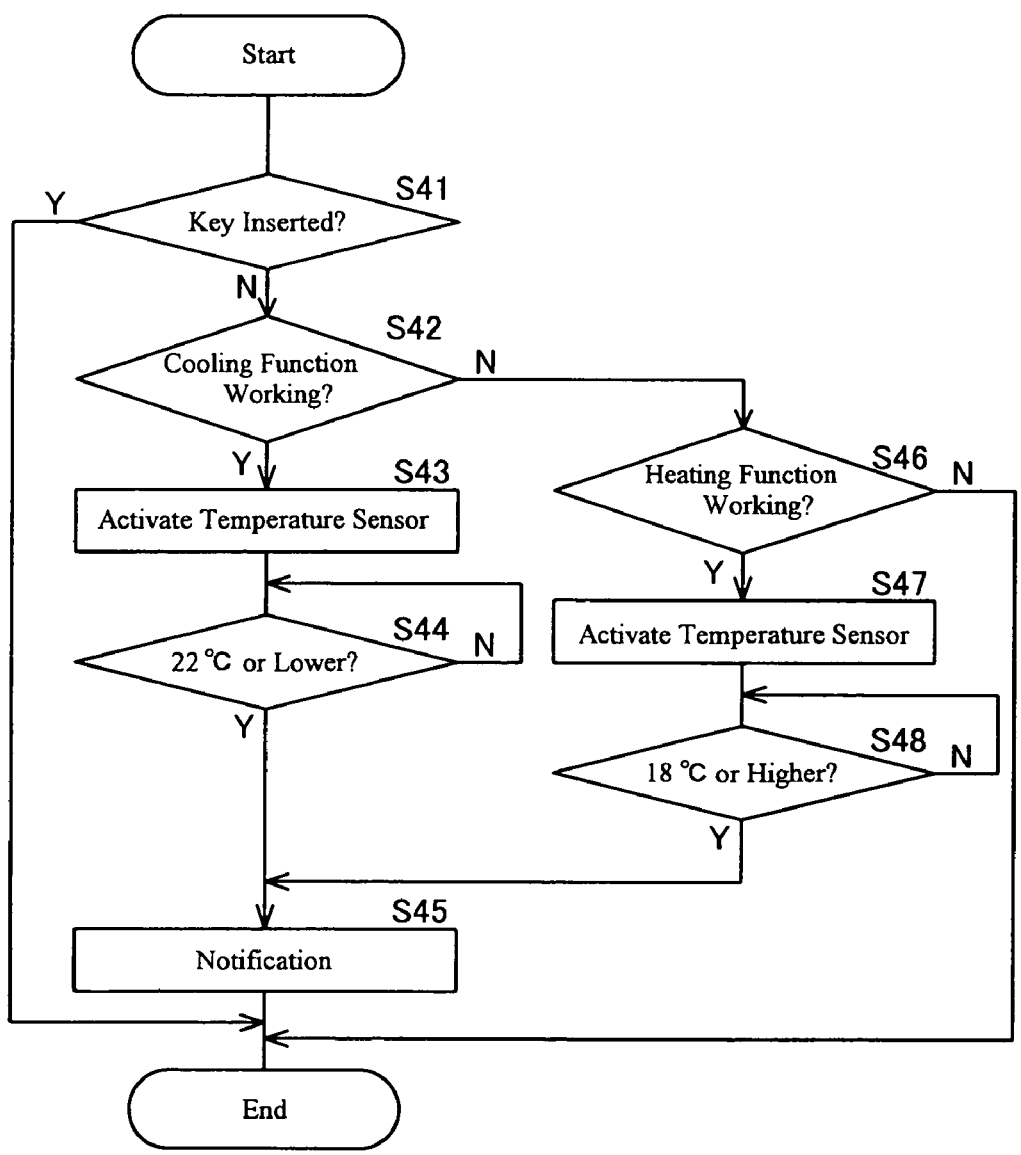
FIG. 9 is a flow chart showing the processing operation performed by a microcomputer in the vehicle environment control device according to the fourth embodiment.

The processing operation ④ performed by the microcomputer 52 in the vehicle environment control device 51 according to the fourth embodiment is described below by reference to a flow chart shown in FIG. 9. First, whether or not an ignition key has been inserted in the key cylinder is judged based on information obtained from the key insertion detection sensor 57 (Step 41).

When it is judged that no ignition key has been inserted in the key cylinder, it is considered that the driver is away from the vehicle M, and whether or not the cooling function is working is judged based on information obtained from the air conditioning ECU 56 (Step 42). When it is judged that the cooling function is working, the temperature sensor 55 is activated (Step 43). Based on information obtained from the temperature sensor 55, whether or not the room temperature of the vehicle M is not more than 22° C. is judged (Step 44).

When it is judged that the room temperature of the vehicle M is not more than 22° C. (or it became a suitable temperature in summer), information indicating that the room temperature of the vehicle M became a suitable temperature is transmitted to a prescribed destination (such as a portable phone being carried by the driver) using the communication section 54 (Step 45).

On the other hand, when it is judged that the cooling function is not working in Step 42, whether or not the heating function is working is judged based on information obtained from the air conditioning ECU 56 (Step 46). When it is judged that the heating function is working, the temperature sensor 55 is activated (Step 47). Based on information obtained from the temperature sensor 55, whether or not the room temperature of the vehicle M is not less than 18° C. is judged (Step 48).

When it is judged that the room temperature of the vehicle M is not less than 18° C. (or it became a suitable temperature in winter), information indicating that the room temperature of the vehicle M became a suitable temperature is transmitted to a prescribed destination (such as a portable phone being carried by the driver) using the communication section 54 (Step 45). On the other hand, when it is judged that the heating function is not working in Step 46, the processing operation ④ is ended at once.

Using the vehicle environment control device according to the above fourth embodiment, when the room temperature of the vehicle M became a suitable temperature for the season, information indicating the effect is transmitted to the portable phone or the like being carried by the driver using the communication section 54. Thus, the driver can get on the vehicle M after the room temperature became a suitable one. Here, as a method for transmitting the information to the prescribed destination, a method is exemplified, wherein the information is transmitted using a telephone line or the like. Besides, it may be transmitted using the information network service such as 'G-BOOK'.

Using the vehicle environment control device according to the above fourth embodiment, when the room temperature of the vehicle M became a suitable temperature for the season, that is notified to the prescribed destination. But in a vehicle environment control device according to another embodiment, when the room temperature became a temperature previously selected by the user, that may be notified thereto, or when a prescribed drop or more in temperature was caused by operating a cooling unit or a prescribed rise or more in temperature was caused by operating a heating unit, that may be notified thereto. In a vehicle environment control device according to still another embodiment, when a transmission is requested by the user, the then room temperature may be notified thereto.

Figure 10:
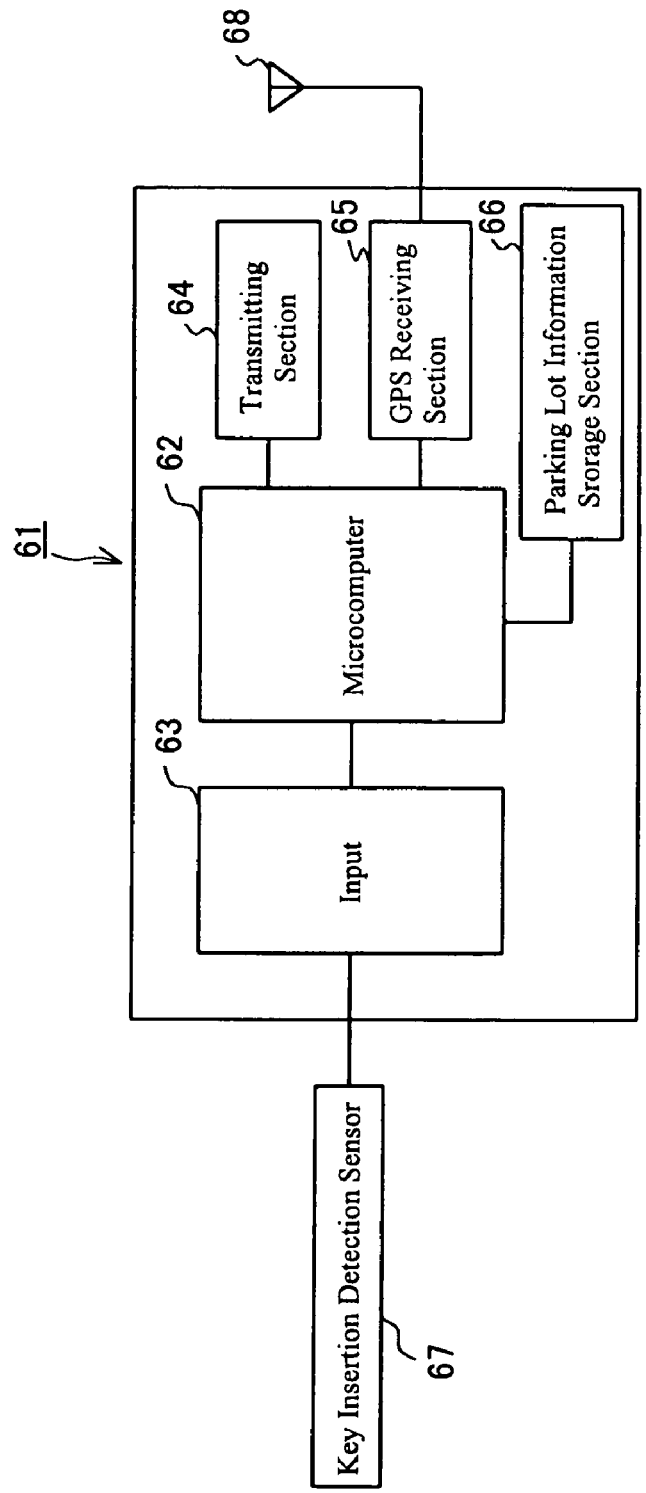
FIG. 10 is a block diagram schematically showing the principal part of a vehicle environment control system comprising a vehicle environment control device according to a fifth embodiment.

FIG. 10 is a block diagram schematically showing the principal part of a vehicle environment control system comprising a vehicle environment control device according to a fifth embodiment. Reference numeral 61 in the figure represents a vehicle environment control device, comprising a microcomputer 62, an input processing section 63, a communication section 64 for transmitting information to the outside of the vehicle M (such as a portable phone being carried by the driver), a GPS receiving section 65 for receiving GPS signals from satellites, and a parking lot information storage section 66 for storing positional information and fee information required for calculating a parking fee associated with each pay parking lot.

To the input processing section 63, a key insertion detection sensor 67 for detecting whether or not an ignition key has been inserted in a key cylinder of the vehicle M is connected, and an antenna 68 is connected to the GPS receiving section 65.

FIG. 11 is a structure of tabulated data showing an example of positional information of each pay parking lot and fee information thereof required for calculating a parking fee stored in the parking lot information storage section 66. Information concerning the 'name', 'address', 'position (area)', 'initial fee' 'time (Δt) before an additional fee' and 'a fee added every elapse of the time Δt' of each pay parking lot is stored with each data number. For example, information that the name of a parking lot having a data number '001' is 'AA Car Park', the address thereof is 'XXX, Chuo-ku, Osaka-shi', the position thereof is '$x_1$, $y_1$', the initial fee thereof is '250 yen' and 250 yen is added to the parking fee every 30 minutes is stored.

Figure 12:
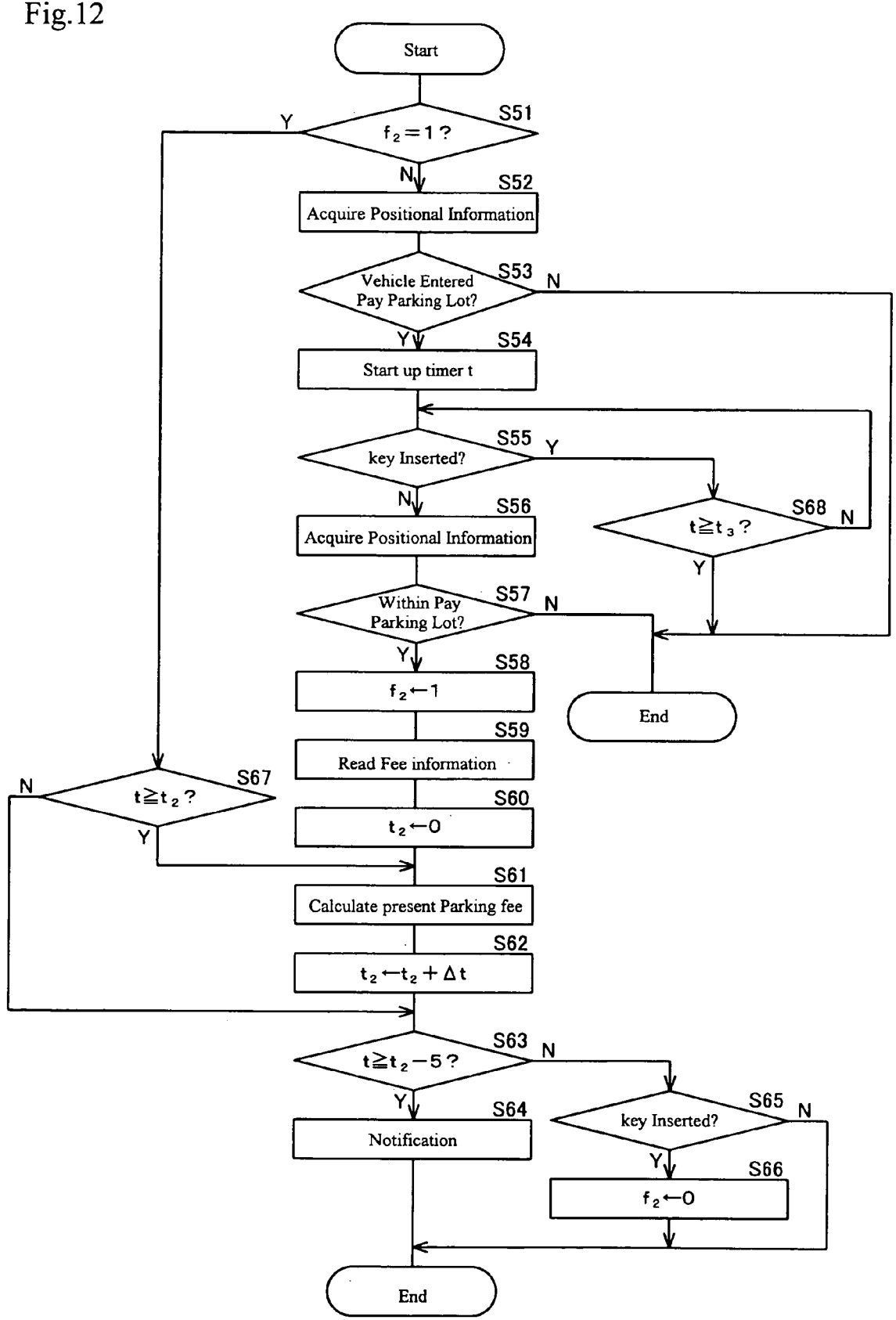
FIG. 12 is a flow chart showing the processing operation performed by a microcomputer in the vehicle environment control device according to the fifth embodiment.

The processing operation ⑤ performed by the microcomputer 62 in the vehicle environment control device 61 according to the fifth embodiment is described below by reference to a flow chart shown in FIG. 12. First, whether a flag $f_2$, which indicates 1 when the vehicle M has been parked in a pay parking lot, is 1 or not is judged (Step 51). When the flag $f_2$ is judged not to be 1, positional information of the current position of the vehicle M obtained from the GPS receiving section 65 is acquired (Step 52).

Whether or not the vehicle M entered a pay parking lot is judged based on the acquired positional information of the current position of the vehicle M and the positional information (or area information) of the pay parking lot stored in the parking lot information storage section 66 (Step 53). When it is judged that the vehicle M entered the pay parking lot, a timer t is set at 0 and is started up (Step 54). On the other hand, when it is judged that the vehicle M has not entered the pay parking lot, the processing operation ⑤ is ended at once.

Whether or not an ignition key has inserted in the key cylinder is judged based on information obtained from the key insertion detection sensor 67 (Step 55). When it is judged that no ignition key has been inserted in the key cylinder (or there is a high possibility that the driver has left the vehicle M), positional information of the current position of the vehicle M obtained from the GPS receiving section 65 is acquired (Step 56). Based on the acquired positional information of the current position of the vehicle M and the positional information (or area information) of a pay parking lot stored in the parking lot information storage section 66, whether or not the vehicle M is within the pay parking lot is judged (Step 57).

When it is judged that the vehicle M is within the pay parking lot, it is considered that the vehicle M has been parked in the pay parking lot, and the flag $f_2$ is turned to 1 (Step 58). Then, information concerning the fee for the pay parking lot in which the vehicle M has been parked is read from the parking lot information storage section 66 (Step 59). A time $t_2$ for showing a time before the next additional fee is turned to 0 (Step 60). On the other hand, when it is judged that the vehicle M is not within the pay parking lot in Step 57, the processing operation ⑤ is ended at once.

A parking fee at the present time is calculated based on the fee information (Step 61), the time Δt before an additional fee is added to the time $t_2$ (Step 62), and then, the operation goes to Step 63. For example, when the vehicle M has been parked in a pay parking lot having the data number '001', the parking fee calculated just after starting the parking in Step 61 is '250 yen', and the time $t_2$ obtained in Step 62 is '30 minutes'.

Whether or not the timer t has counted to not less than a time obtained by subtracting a prescribed time (e.g. 0.1 hour) from the time $t_2$ is judged in Step 63. When it is judged that the timer t has counted to not less than the time ($t_2$−0.1) (or there are less than 6 minutes left before the next additional fee), information about a parking fee at the present time, how much will be added to the present parking fee 6 minutes later and the like is transmitted using the communication section 64 to a prescribed destination (such as a portable phone being carried by the driver) (Step 64).

On the other hand, when it is judged that the timer t has counted to less than the time ($t_2$−0.1) (or there are not less than 6 minutes left before the next additional fee), whether or not an ignition key has been inserted in the key cylinder is judged based on information obtained from the key insertion detection sensor 67 (Step 65). When it is judged that the ignition key has been inserted in the key cylinder (or the driver came back to the vehicle M), it is considered that the vehicle M will soon leave the pay parking lot, and the flag $f_2$ is turned to 0 (Step 66). On the other hand, when it is judged that no ignition key has been inserted in the key cylinder, the processing operation ⑤ is ended at once.

When it is judged that the flag $f_2$ is 1 (or the vehicle M has been parked in the pay parking lot) in Step 51, whether or not the timer t has counted to not less than the time $t_2$ before the next additional fee is judged (Step 67). When it is judged that the timer t has counted to not less than the time $t_2$ (or the fee increased), a present parking fee is newly calculated based on the fee information (Step 61), and the time Δt before an additional fee is added to the time $t_2$ so as to update the time $t_2$ (Step 62).

On the other hand, when it is judged that the timer t has counted to less than the time $t_2$, the operation bypasses Steps 61 and 62 and goes to Step 63 since it is unnecessary to calculate a new present parking fee or to update the time $t_2$.

When it is judged that the ignition key has been inserted in the key cylinder in Step 55, whether or not the timer t has counted to a prescribed time $t_3$ (e.g. 0.1 hour) or more is judged (Step 68). When it is judged that the timer t has counted to the prescribed period $t_3$ or more (or although 6 minutes or more has elapsed after the vehicle M was judged to have entered the pay parking lot, the driver has not left the vehicle M yet), it is considered that the vehicle M did not enter the pay parking lot but is just running near the pay parking lot, and the processing operation ⑤ is ended at once. On the other hand, when it is judged that the timer t has counted to less than the prescribed time $t_3$, it returns to Step 55.

Using the vehicle environment control device according to the above fifth embodiment, the parking situation related to the parking fee (such as that 250 yen will be added to the parking fee 6 minutes later) is found based on the start time of parking in the parking lot and the fee information required for calculating the parking fee for the parking lot, and the obtained information showing the parking situation is transmitted to a prescribed destination (such as a portable phone being carried by the driver) using the communication section 64. Thus, the driver being in a distant place from the vehicle M can grasp the parking situation related to the parking fee. Here, as a method for transmitting the information showing the parking situation to the prescribed destination, a method is exemplified, wherein the information is transmitted using a telephone line or the like. Besides, it may be transmitted using the information network service such as 'G-BOOK'.

In the vehicle environment control device according to the above fifth embodiment, the information showing the parking situation is transmitted with the timing when the fee will increase a prescribed period of time (6 minutes here) later, but the timing of the transmission of the information is not limited to that. In a vehicle environment control device according to another embodiment, the information may be transmitted with the timing when the fee just increased or with the timing when the fee exceeded a preselected fee. In a vehicle environment control device according to still another embodiment, information about a present parking fee or a time before the next additional fee may be transmitted when a user requests the transmission thereof.

Figure 13:
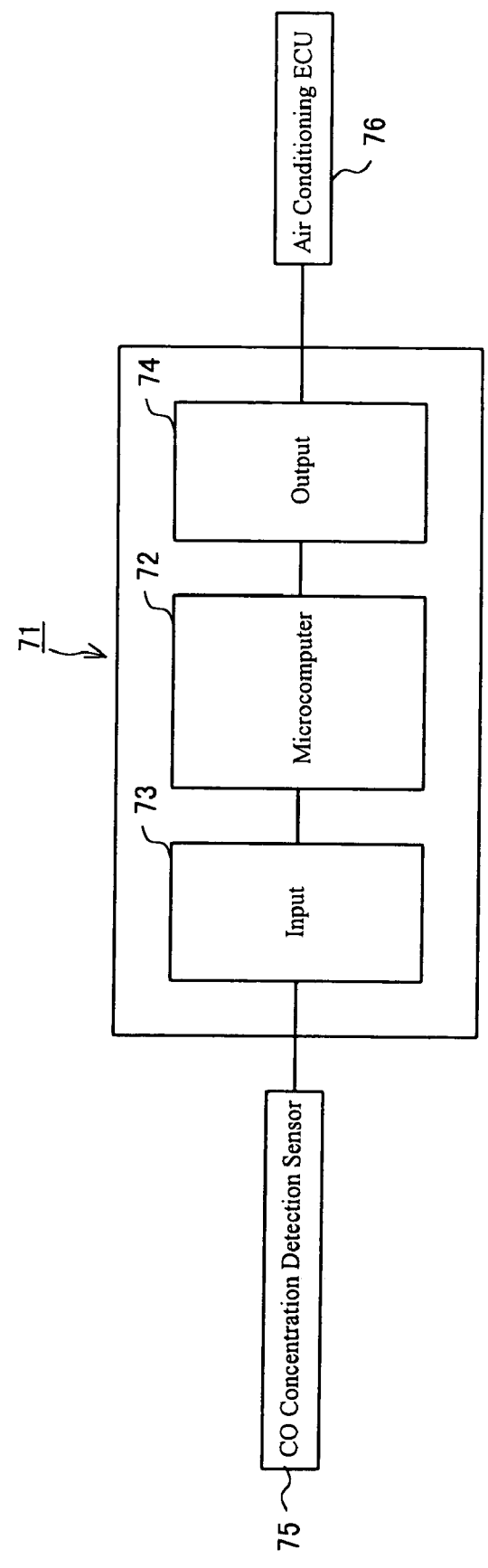
FIG. 13 is a block diagram schematically showing the principal part of a vehicle environment control system comprising a vehicle environment control device according to a sixth embodiment.

FIG. 13 is a block diagram schematically showing the principal part of a vehicle environment control system comprising a vehicle environment control device according to a sixth embodiment. Reference numeral 71 in the figure represents a vehicle environment control device, comprising a microcomputer 72, an input processing section 73 and an output processing section 74. To the input processing section 73, a carbon monoxide concentration detection sensor 75 for detecting the concentration of carbon monoxide (hereinafter, referred to as CO) inside the vehicle M is connected, while to the output processing section 74, an air conditioning ECU 76 for controlling an air conditioner is connected.

Figure 14:
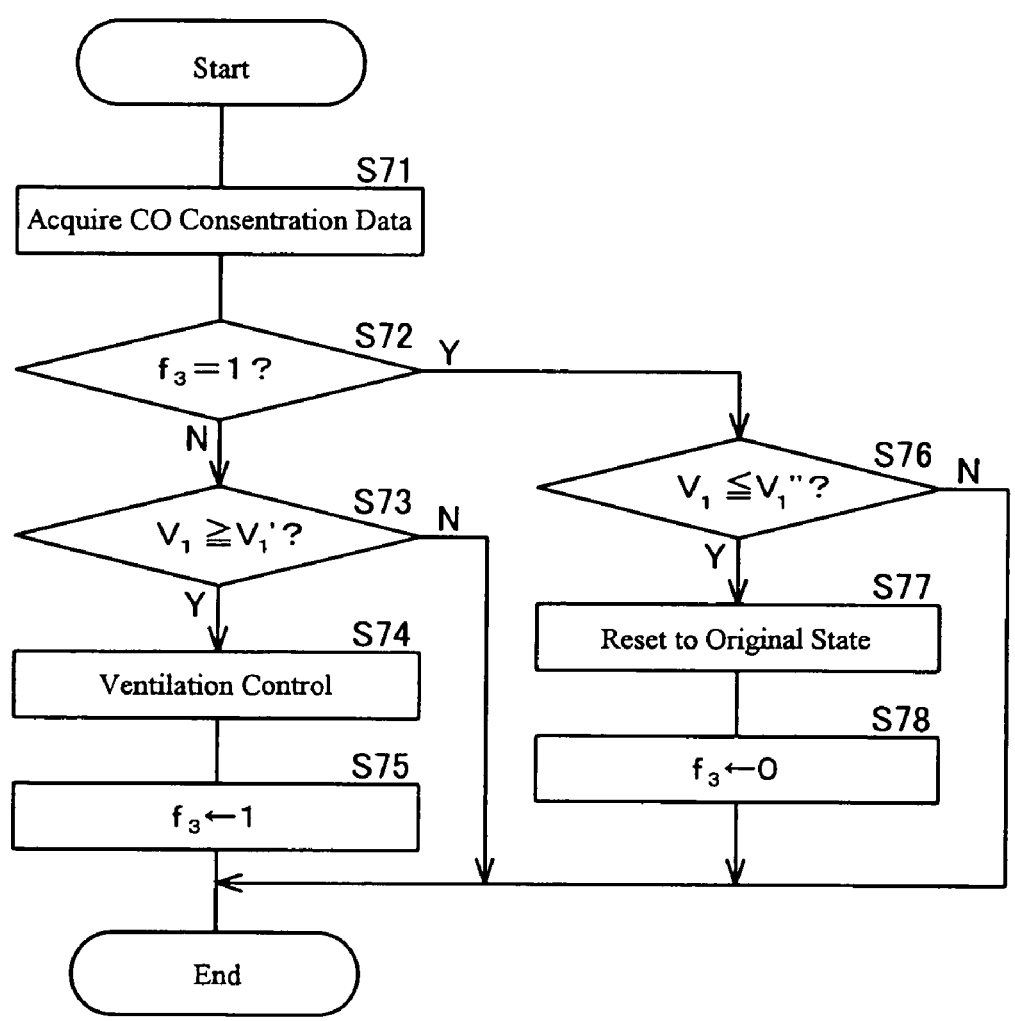
FIG. 14 is a flow chart showing the processing operation performed by a microcomputer in the vehicle environment control device according to the sixth embodiment.

The processing operation ⑥ performed by the microcomputer 72 in the vehicle environment control device 71 according to the sixth embodiment is described below by reference to a flow chart shown in FIG. 14. First, information about the CO concentration inside the vehicle M is acquired based on information obtained from the CO concentration detection sensor 75 (Step 71), and whether a flag $f_3$, which indicates 1 when the ventilation is being conducted for reducing noxious gas inside the vehicle M, is 1 or not is judged (Step 72).

When the flag $f_3$ is judged not to be 1, whether or not the CO concentration $V_1$ inside the vehicle M is a prescribed concentration $V_1'$ or more is judged based on the acquired information concerning the CO concentration inside the vehicle M (Step 73). When it is judged that the CO concentration $V_1$ inside the vehicle M is the prescribed concentration $V_1'$ or more, in order to reduce noxious gas inside the vehicle M, the air conditioning ECU 76 is controlled so as to ventilate the room of the vehicle M (Step 74), and then, the flag $f_3$ is turned to 1 (Step 75). On the other hand, when it is judged that the CO concentration $V_1$ inside the vehicle M is less than the prescribed concentration $V_1'$, the processing operation ⑥ is ended at once.

When the flag $f_3$ is judged to be 1 in Step 72, whether or not the CO concentration $V_1$ inside the vehicle M is not more than a prescribed concentration $V_1''$ ($<V_1'$) is judged (Step 76). When it is judged that the CO concentration $V_1$ inside the vehicle M is not more than the prescribed concentration $V_1''$, the air conditioning ECU 76 is controlled so as to reset the air conditioning to its original state (Step 77), and then, the flag $f_3$ is returned to 0 (Step 78). On the other hand, when it is judged that the CO concentration $V_1$ inside the vehicle M is more than the prescribed concentration $V_1''$, the processing operation ⑥ is ended at once.

Using the vehicle environment control device according to the above sixth embodiment, when the concentration of CO being a noxious gas contained in the room of the vehicle M increases, the ventilation is automatically conducted, so that it is possible to prevent damage to the body of an occupant such as an oxygen deficiency disease. Here, an increase of noxious gas is prohibited through the detection of the concentration of CO, but in another embodiment, the concentration of nitrogen oxides (NOx), hydrocarbon (HC) or the like may be detected.

In a vehicle environment control device according to another embodiment, when the concentration of CO increased with the air conditioning in a state of fresh-air intake, the air conditioning may be switched from the fresh-air intake to inside-air circulation. In a vehicle environment control device according to still another embodiment, when the concentration of CO increased without the air conditioning in a state of fresh-air intake, windows may be automatically opened.

Figure 15:
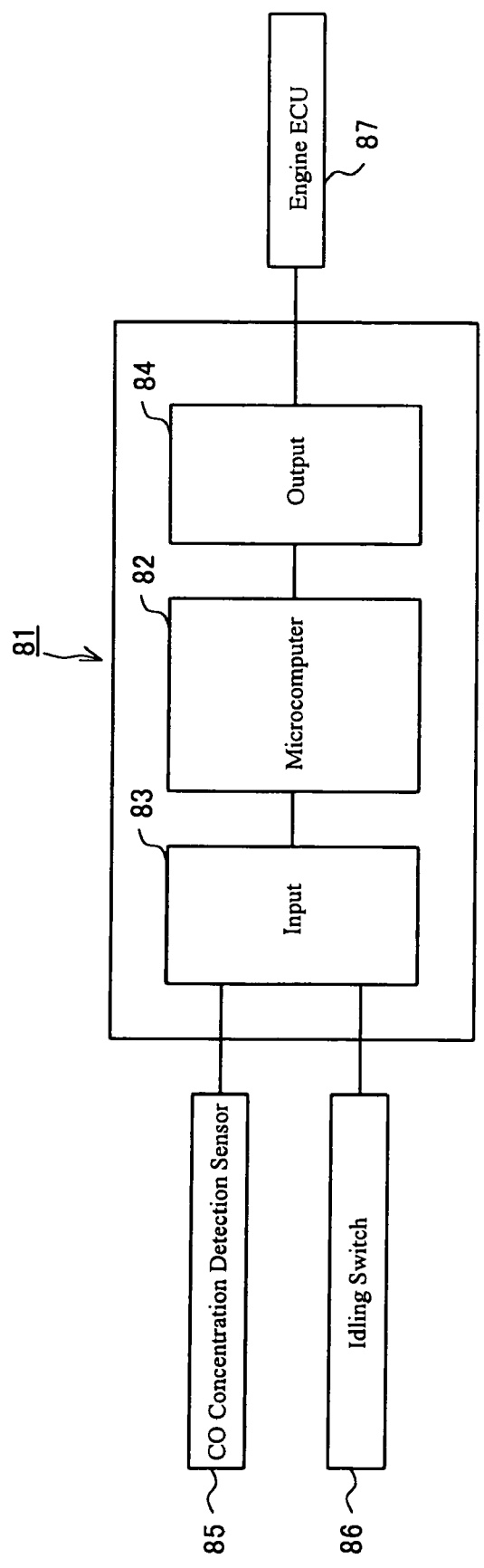
FIG. 15 is a block diagram schematically showing the principal part of a vehicle environment control system comprising a vehicle environment control device according to a seventh embodiment.

FIG. 15 is a block diagram schematically showing the principal part of a vehicle environment control system comprising a vehicle environment control device according to a seventh embodiment. Reference numeral 81 in the figure represents a vehicle environment control device, comprising a microcomputer 82, an input processing section 83 and an output processing section 84. To the input processing section 83, a CO concentration detection sensor 85 for detecting the concentration of CO outside the vehicle M and an idling switch 86 for outputting an ON signal when the vehicle M is in an idling state is connected, while to the output processing section 84, an engine ECU 87 for controlling an engine is connected.

Figure 16:
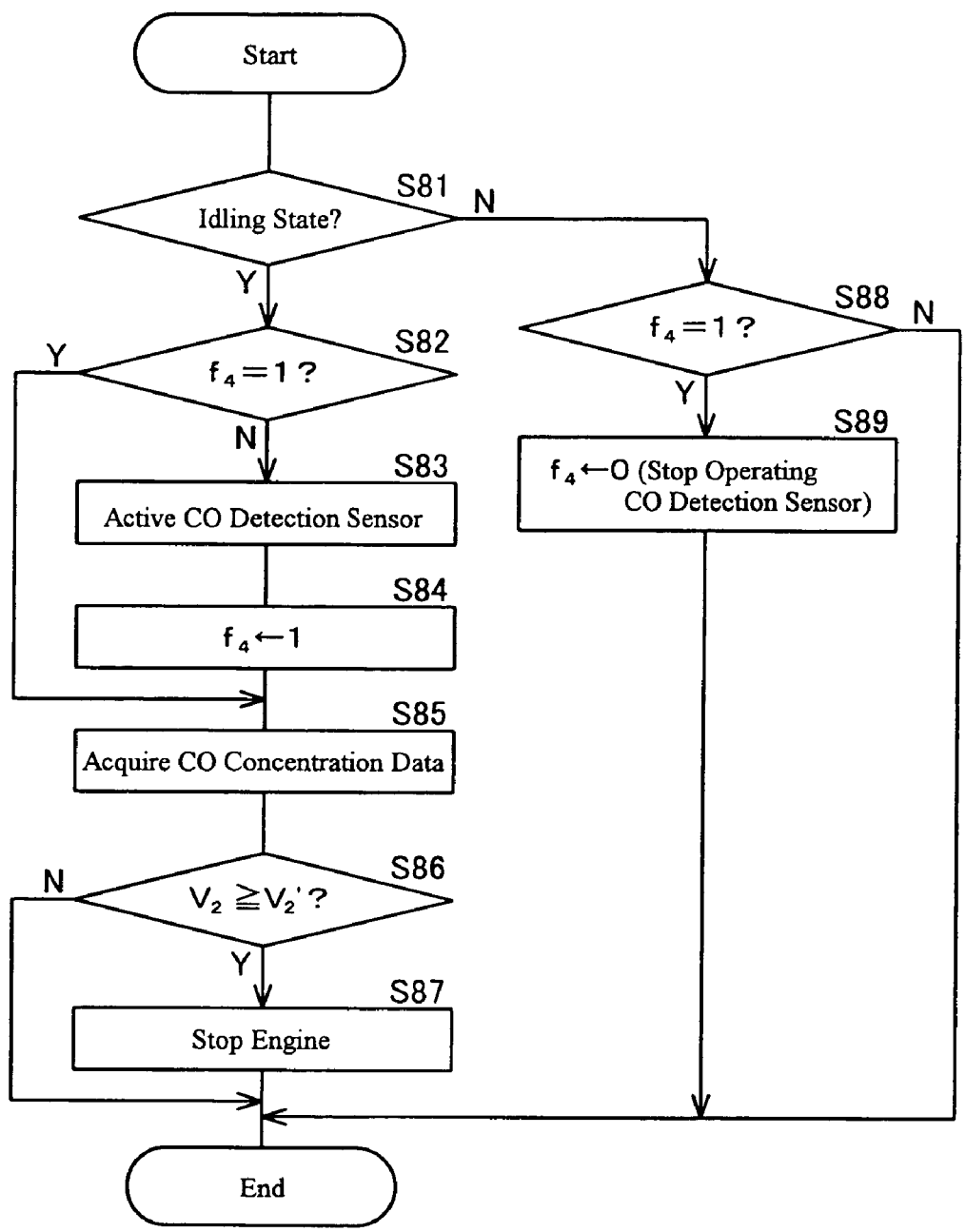
FIG. 16 is a flow chart showing the processing operation performed by a microcomputer in the vehicle environment control device according to the seventh embodiment.

The processing operation ⑦ performed by the microcomputer 82 in the vehicle environment control device 81 according to the seventh embodiment is described below by reference to a flow chart shown in FIG. 16. First, whether or not the vehicle M is in an idling state is judged based on a signal obtained from the idling switch 86 (Step 81).

When it is judged that the vehicle M is in an idling state, whether a flag $f_4$, which indicates 1 when the CO concentration detection sensor 85 is in operation, is 1 or not is judged (Step 82). When it is judged that the flag $f_4$ is not 1 (or the CO concentration detection sensor 85 is not in operation), the CO concentration detection sensor 85 is activated (Step 83), the flag $f_4$ is turned to 1 (Step 84), and then, the operation goes to Step 85. On the other hand, when the flag $f_4$ is judged to be 1, it bypasses Steps 83 and 84, and goes directly to Step 85.

Information concerning the CO concentration outside the vehicle M is acquired based on information obtained from the CO concentration detection sensor 85 in Step 85. Then, based on the acquired information concerning the CO concentration outside the vehicle M, whether or not the CO concentration $V_2$ outside the vehicle M is not less than a prescribed concentration $V_2'$ is judged (Step 86). When it is judged that the CO concentration $V_2$ outside the vehicle M is not less than the prescribed concentration $V_2'$, it is considered that the amount of noxious gas outside the vehicle M has increased because of the idling state of the vehicle M, and the engine ECU 87 is controlled so as to stop the engine (Step 87). On the other hand, when it is judged that the CO concentration $V_2$ outside the vehicle M is less than the prescribed concentration $V_2'$, the processing operation ⑦ is ended at once.

When it is judged that the vehicle M is not in an idling state in Step 81, whether the flag $f_4$ is 1 or not is judged (Step 88). When the flag $f_4$ is judged to be 1, the CO concentration detection sensor 85 is stopped operating and the flag $f_4$ is returned to 0 (Step 89). On the other hand, when the flag $f_4$ is judged not to be 1, the processing operation ⑦ is ended at once.

Using the vehicle environment control device according to the above seventh embodiment, when the concentration of CO being a noxious gas contained outside the vehicle M increased with the vehicle M being in an idling state, the engine is stopped. Thus, for example, even if the vehicle M is left in an idling state inside a garage of the user's house, the engine of the vehicle M is automatically stopped when noxious gas increases, so that it is possible to prevent noxious gas from filling the house. Here, an increase of noxious gas is prohibited through the detection of the concentration of CO, but in another embodiment, the concentration of nitrogen oxides (NOx), hydrocarbon (HC) or the like may be detected.

Figure 17:
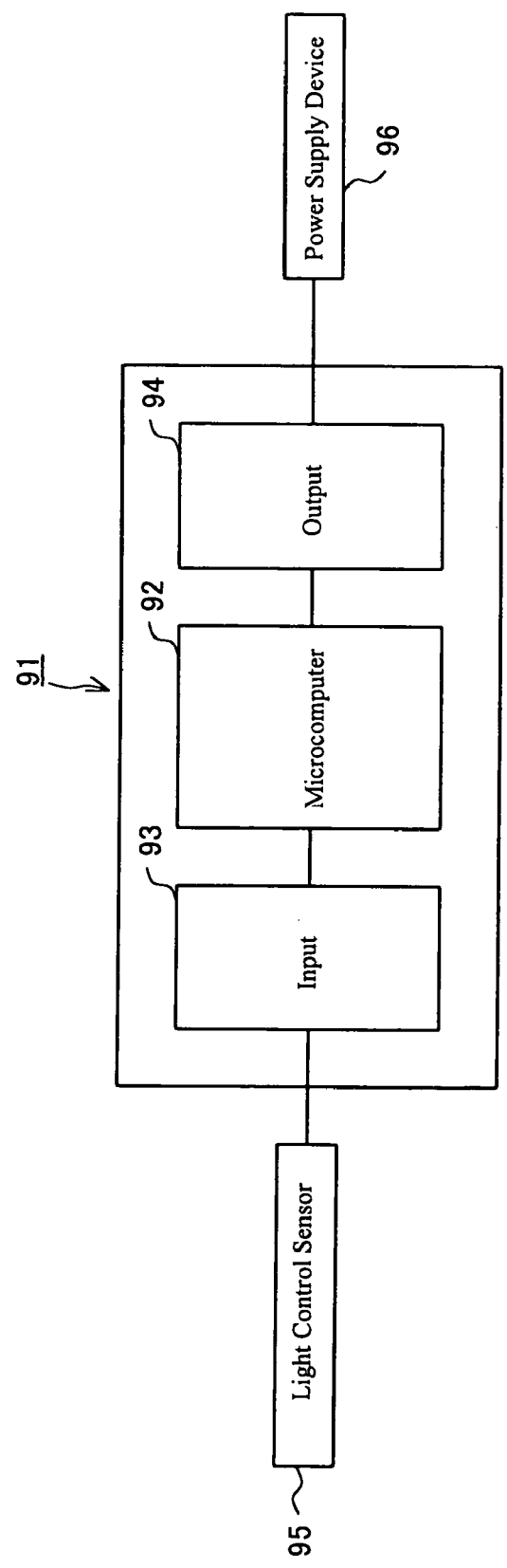
FIG. 17 is a block diagram schematically showing the principal part of a vehicle environment control system comprising a vehicle environment control device according to an eighth embodiment.

FIG. 17 is a block diagram schematically showing the principal part of a vehicle environment control system comprising a vehicle environment control device according to an eighth embodiment. Reference numeral 91 in the figure represents a vehicle environment control device, comprising a microcomputer 92, an input processing section 93 and an output processing section 94. To the input processing section 93, a light control sensor 95 for measuring the illuminance around the vehicle M is connected, while to the output processing section 94, a power supply device 96 for supplying an electric power to a horn (not shown) for sounding a horn sound is connected.

Figure 18:
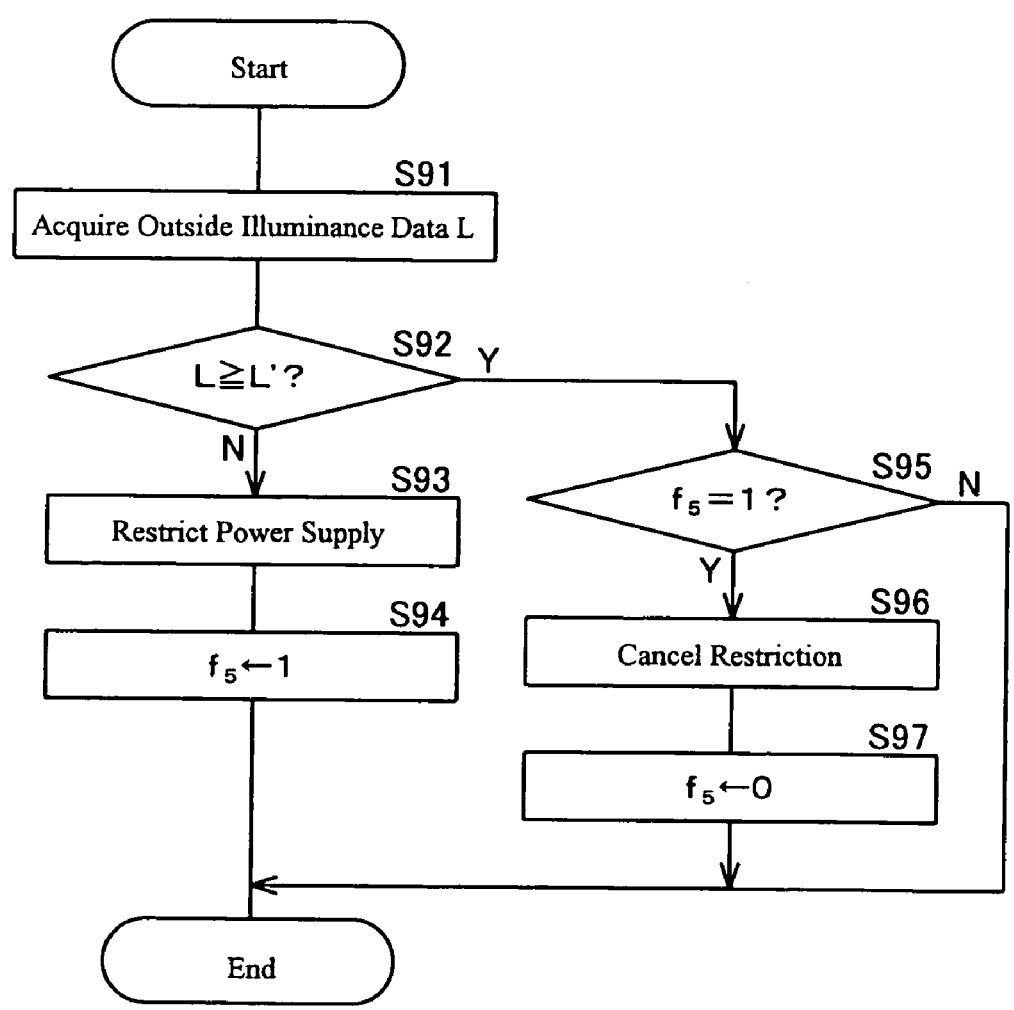
FIG. 18 is a flow chart showing the processing operation performed by a microcomputer in the vehicle environment control device according to the eighth embodiment.

The processing operation ⑧ performed by the microcomputer 92 in the vehicle environment control device 91 according to the eighth embodiment is described below by reference to a flow chart shown in FIG. 18. First, information concerning the illuminance around the vehicle M is acquired based on information obtained from the light control sensor 95 (Step 91). Then, based on the acquired information concerning the illuminance around the vehicle M, whether or not the illuminance L around the vehicle M is not less than a prescribed illuminance L' is judged (Step 92).

When it is judged that the illuminance L is less than the prescribed illuminance L', it is considered that the vehicle M is running in a quiet place, and the power supply device 96 is controlled so as to restrict the power supply to the horn (Step 93). Thereafter, a flag $f_5$ for indicating that the power supply was restricted is turned to 1 (Step 94).

On the other hand, when it is judged that the illuminance L is not less than the prescribed illuminance L', whether the flag $f_5$ is 1 or not is judged (Step 95). When it is judged that the flag $f_5$ is 1 (or the power supply has been restricted), the power supply device 96 is controlled so as to cancel the restriction of the power supply to the horn (Step 96). Thereafter, the flag $f_5$ is returned to 0 (Step 97). On the other hand, when the flag $f_5$ is judged not to be 1, the processing operation ⑧ is ended at once.

Using the vehicle environment control device according to the above eighth embodiment, in the case of the vehicle M being in a quiet place, the horn sound generated from the vehicle M is made smaller. Thus, it is possible to prevent generating an annoying big horn sound. Here, the judgment on whether or not the vehicle M is in a quiet place is made based on the information obtained from the light control sensor 95, but in another embodiment, the noise level around the vehicle M, time information, travel area information obtained from a navigation system and the like mounted on the vehicle M or the like may be adopted. For example, when the noise level is not more than a prescribed level, or the present time is between 11 p.m. and 6 a.m., or the vehicle M is away from an urban area, it is possible to judge that the vehicle M is in a quiet place.

Figure 19:
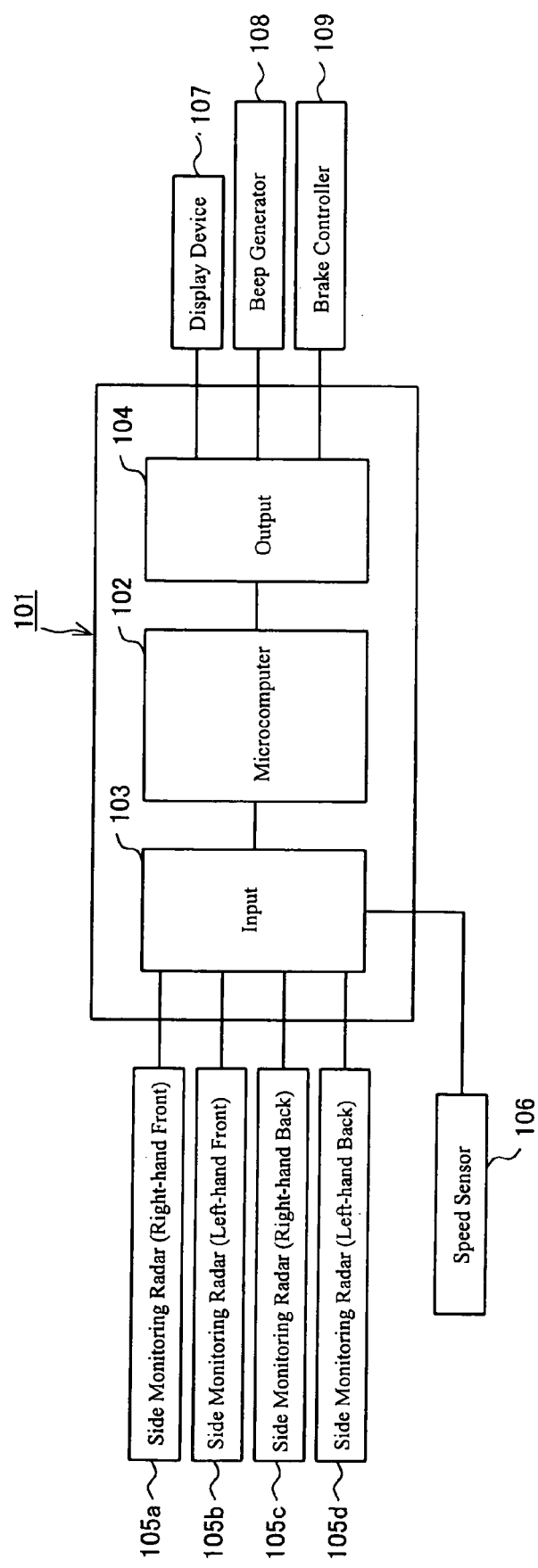
FIG. 19 is a block diagram schematically showing the principal part of a vehicle environment control system comprising a vehicle environment control device according to a ninth embodiment.

FIG. 19 is a block diagram schematically showing the principal part of a vehicle environment control system comprising a vehicle environment control device according to a ninth embodiment. Reference numeral 101 in the figure represents a vehicle environment control device, comprising a microcomputer 102, an input processing section 103 and an output processing section 104. To the input processing section 103, side monitoring radars 105a–105d for monitoring the side of the lower portion of the vehicle M and a speed sensor 106 for detecting the velocity of the vehicle M are connected, while to the output processing section 104, a display device 107, a beep generator 108 for generating a beep and a brake controller 109 for controlling a brake of the vehicle M are connected.

Here, the side monitoring radars 105a–105d are radars for monitoring the right-hand front, left-hand front, right-hand back and left-hand back sides of the lower portion of the vehicle M (particularly wheels), respectively. As the side monitoring radars 105a–105d, UWB (Ultra Wide Band) radars are exemplified, and the monitoring distance is desirably set to be up to about 1 m.

Figure 20:
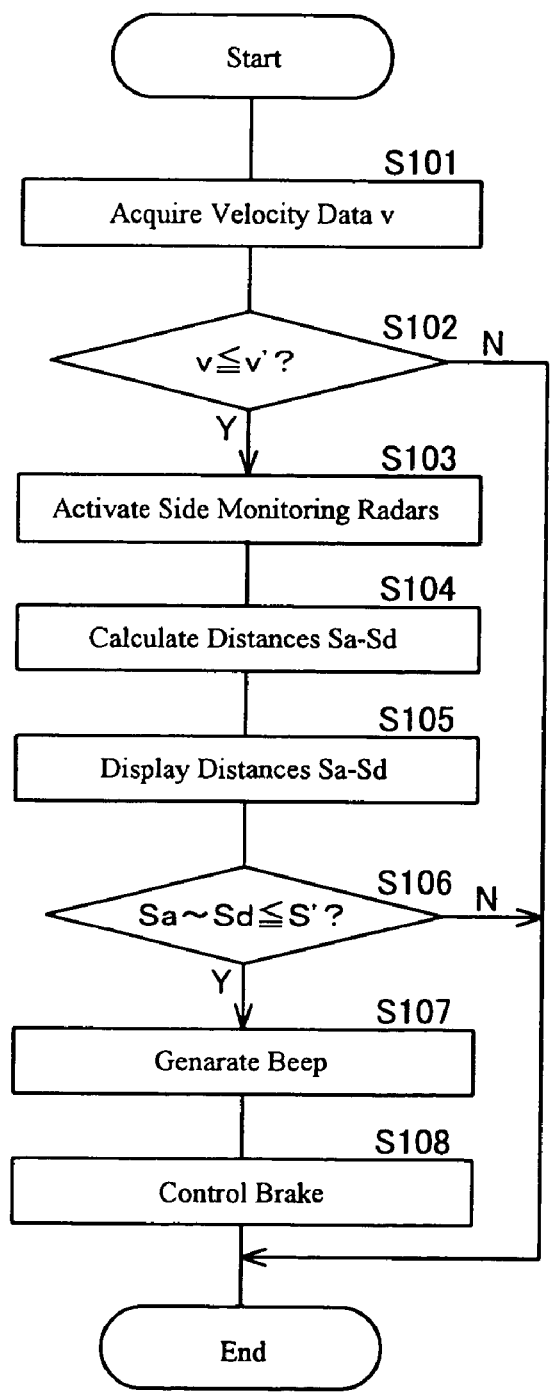
FIG. 20 is a flow chart showing the processing operation performed by a microcomputer in the vehicle environment control device according to the ninth embodiment.

The processing operation ⑨ performed by the microcomputer 102 in the vehicle environment control device 101 according to the ninth embodiment is described below by reference to a flow chart shown in FIG. 20. First, velocity data v of the vehicle M is acquired based on information obtained from the speed sensor 106 (Step 101), and whether or not the velocity v of the vehicle M is not more than a prescribed velocity v' (e.g. 5 km/h) is judged (Step 102).

When it is judged that the velocity v thereof is not more than the prescribed velocity v' (or there is a possibility that the vehicle M is being parked), the side monitoring radars 105a–105d are activated in order to assist the parking (Step 103). Then, based on information obtained from the side monitoring radars 105a–105d, the distances Sa–Sd from obstacles each being present at the right-hand front, left-hand front, right-hand back and left-hand back sides of the lower portion of the vehicle M are found (Step 104), and the distances Sa–Sd from the obstacles each being present at the right-hand front, left-hand front, right-hand back and left-hand back sides of the lower portion thereof are shown on the display device 107 (Step 105). On the other hand, when it is judged that the velocity v thereof is more than the prescribed velocity v', the processing operation ⑨ is ended at once.

Whether one of the distances Sa–Sd is not more than a prescribed distance S' (e.g. 20 cm) is judged (Step 106). When it is judged that one of the distances Sa–Sd is not more than the prescribed distance S', or that the distance from an obstacle being present at any of the right-hand front, left-hand front, right-hand back and left-hand back sides of the lower portion of the vehicle M is short, resulting in a risk of a wheel's rubbing a road shoulder or the like, the beep generator 108 is controlled so as to generate a beep for informing the driver of a risk of a wheel's rubbing a road shoulder or the like (Step 107). Furthermore, the brake controller 109 is controlled so as to brake and stop the vehicle M (Step 108). On the other hand, when it is judged that all of the distances Sa–Sd are more than the prescribed distance S', the processing operation ⑨ is ended at once.

Using the vehicle environment control device according to the above ninth embodiment, the distances Sa–Sd from obstacles (such as a road shoulder) present in a lateral direction of the lower portion of the vehicle M are found, and the distances Sa–Sd from the obstacles are displayed, or when any of the distances from the obstacles is extremely short, a beep is sounded or the vehicle M is stopped. Thus, the driver can avoid damaging a wheel or the like when parking the vehicle M.

In the vehicle environment control device according to the above ninth embodiment, by sounding a beep, the driver is informed of that the vehicle is approaching an obstacle being present at the side thereof, but in a vehicle environment control device according to another embodiment, a message 'A wheel may be damaged.' or the like may be output. In still another embodiment, a message 'Pay attention to the right front tire.' may be output so that the driver can easily recognize at which of the right-hand front, left-hand front, right-hand back and left-hand back sides, the vehicle is approaching an obstacle.

In the vehicle environment control device according to the above ninth embodiment, the distance from an obstacle being present at the side of the lower portion of the vehicle M is found based on the information obtained from the radars, but the calculation of the distance is not limited to the information obtained from the radar. For example, based on pictorial data taken by a camera, it may be calculated.

Figure 21:
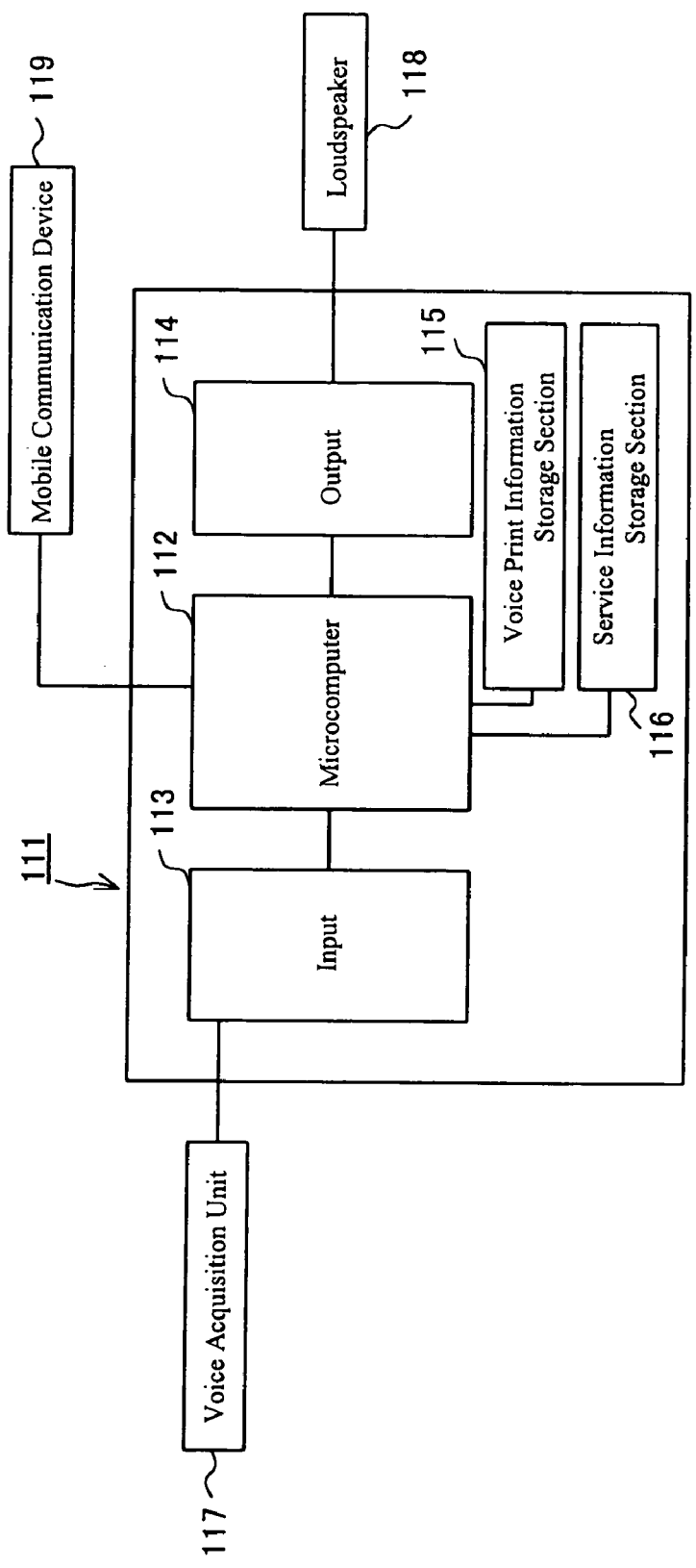
FIG. 21 is a block diagram schematically showing the principal part of a vehicle environment control system comprising a vehicle environment control device according to a tenth embodiment.

FIG. 21 is a block diagram schematically showing the principal part of a vehicle environment control system comprising a vehicle environment control device according to a tenth embodiment. Reference numeral 111 in the figure represents a vehicle environment control device, comprising a microcomputer 112, an input processing section 113, an output processing section 114, a voice print information storage section 115 for storing information concerning one or multiple voice prints, and a service information storage section 116 for storing information (such as information about a schedule) to be provided to each person associated with each person. To the input processing section 113, a voice acquisition unit (microphone) 117 for acquiring a voice is connected, while to the output processing section 114, a loudspeaker 118 is connected.

A mobile communication device 119 such as a portable phone is connected to the microcomputer 112 so that data can be exchanged with an information processor installed outside using the mobile communication device 119. For example, information to be provided to each person is captured from the outside sources so as to be stored in the service information storage section 116.

Figure 22:
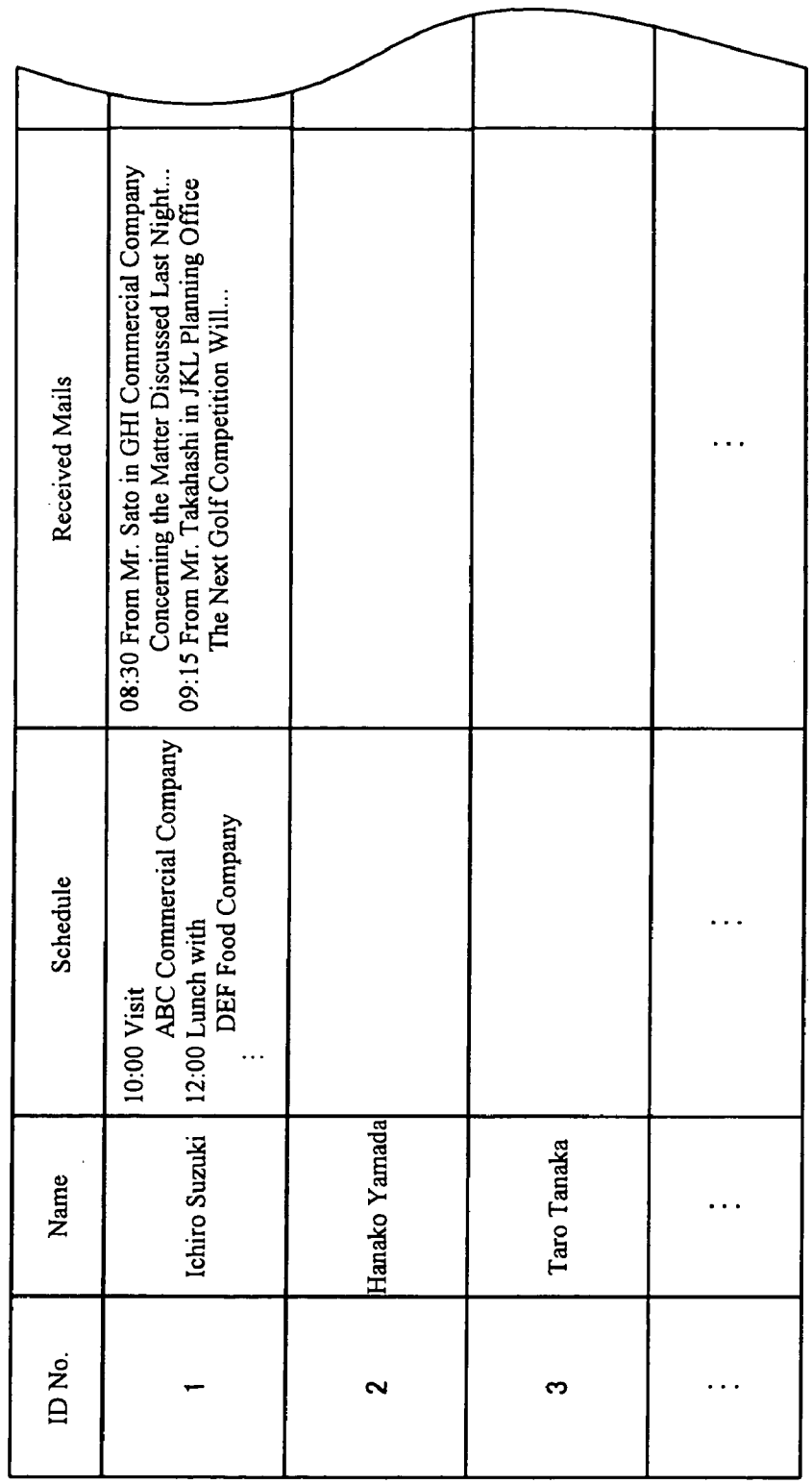
FIG. 22 is a table showing an example of information to be provided to each person stored in a service information storage section of the vehicle environment control device according to the tenth embodiment.

FIG. 22 is a structure of tabulated data showing an example of information to be provided to each person, being stored in the service information storage section 116. Information concerning the 'name', 'schedule' and 'received mails' of each person is stored with each identification number. For example, information concerning a person corresponding to an identification number '1', that is, the name thereof is Ichiro Suzuki, his today's schedule is 'Visit ABC Commercial Company at 10:00 and lunch with DEF Food Company at 12:00', and the received mails sent to his mail address 'From Mr. Sato in GHI Commercial Company at 8:30, concerning the matter discussed last night . . . and from Mr. Takahashi in JKL Planning Office at 9:15, the next golf competition will . . . ', is stored.

Figure 23:
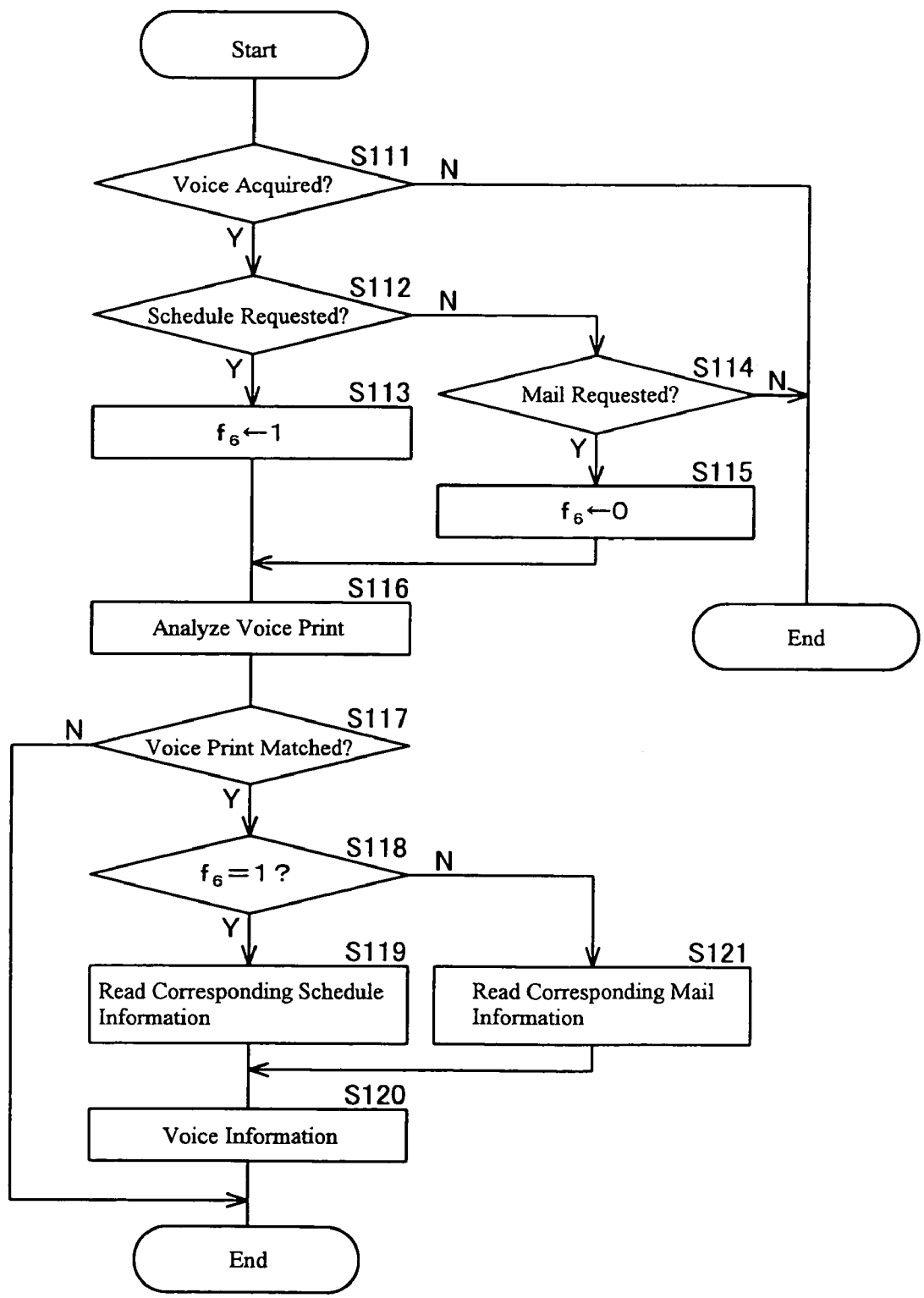
FIG. 23 is a flow chart showing the processing operation performed by a microcomputer in the vehicle environment control device according to the tenth embodiment.

The processing operation ⓦ performed by the microcomputer 112 in the vehicle environment control device 111 according to the tenth embodiment is described below by reference to a flow chart shown in FIG. 23. First, whether or not a voice at a fixed level or more was sounded inside the vehicle M is judged based on information obtained from the voice acquisition unit 117 (Step 111). When it is judged that a voice at the fixed level or more was sounded inside the vehicle M, whether or not its speaker requested the presentation of a schedule by analyzing the voice (Step 112). Here, as a method for judging whether or not the speaker requested the presentation of a schedule, a method is exemplified, wherein whether or not the speaker said "Request schedule.", "Schedule, please." or the like is judged. On the other hand, when it is judged that no voice at the fixed level or more has been sounded inside the vehicle M, the processing operation ⓦ is ended at once.

When it is judged that the speaker requested the presentation of a schedule (for example, the speaker said "Request schedule."), a flag $f_6$ for indicating that the presentation of a schedule is requested is turned to 1 (Step 113), and then, the operation goes to Step 116. On the other hand, when it is judged that the speaker did not request the presentation of a schedule, whether or not the speaker requested the presentation of received mails sent to his/her mail address is judged (Step 114). Here, as a method for judging whether or not the speaker requested the presentation of received mails, a method is exemplified, wherein whether or not the speaker said "Request mails.", "Mails, please." or the like is judged.

When it is judged that the speaker requested the presentation of received mails (for example, the speaker said, "Request mail."), the flag $f_6$ is turned to 0 (Step 115), and then, the operation goes to Step 116. On the other hand, when it is judged that the speaker did not request the presentation of received mails (or the words spoken inside the vehicle M are for requesting neither the presentation of a schedule nor the presentation of received mails), the processing operation ⓦ is ended at once.

Based on information obtained from the voice acquisition unit 117, the voice print originating in the speaker is analyzed in Step 116. Then, whether or not the speaker can be identified based on the analyzed voice print information and the voice print information stored in the voice print information storage section 115 is judged (Step 117).

When it is judged that the speaker was identified, whether the flag $f_6$ is 1 or not is judged (Step 118). When it is judged that the flag $f_6$ is 1 (or the speaker requested the presentation of a schedule), information regarding a schedule to be provided to the speaker is read out from the service information storage section 116 based on the result of identification of the speaker through the voice print information in Step 117 (Step 119). Based on the read information, the information regarding a schedule is presented by voice through the loudspeaker 118 (Step 120).

On the other hand, when it is judged that the flag $f_6$ is not 1 (or the speaker requested the presentation of received mails), information regarding received mails to be provided to the speaker is read out from the service information storage section 116 based on the result of identification of the speaker through the voice print information in Step 117 (Step 121). Based on the read information, the information regarding received mails is presented by voice through the loudspeaker 118 (Step 120). When it is judged that the speaker could not be identified in Step 117, the processing operation ⓦ is ended at once.

Using the vehicle environment control device according to the above tenth embodiment, an occupant of the vehicle M is identified, information to be provided to the identified occupant is read out, and the information (such as regarding a schedule or received mails) to be provided to the occupant is provided by voice to the occupant. As a result, a device acting as secretary can be realized.

Here, in the vehicle environment control device according to the above tenth embodiment, the identification of an occupant of the vehicle M is conducted based on the voice print information, but this identification is not limited to the use of the voice print information. For example, other biometric information such as fingerprint information or face image information may be used. Or the biometric information may not be necessarily used. For example, a password or the like assigned to each person may be input.

In the vehicle environment control device according to the above tenth embodiment, information to be provided to an occupant has been previously stored in the service information storage section 116, and when a request is made by the occupant, the information read from the service information storage section 116 is provided to the occupant. But in a vehicle environment control device according to anther embodiment, when an occupant makes a request, which becomes a trigger, information may be acquired through access to an information providing device installed outside, so that the acquired information from the information providing device is provided.

Figure 24:
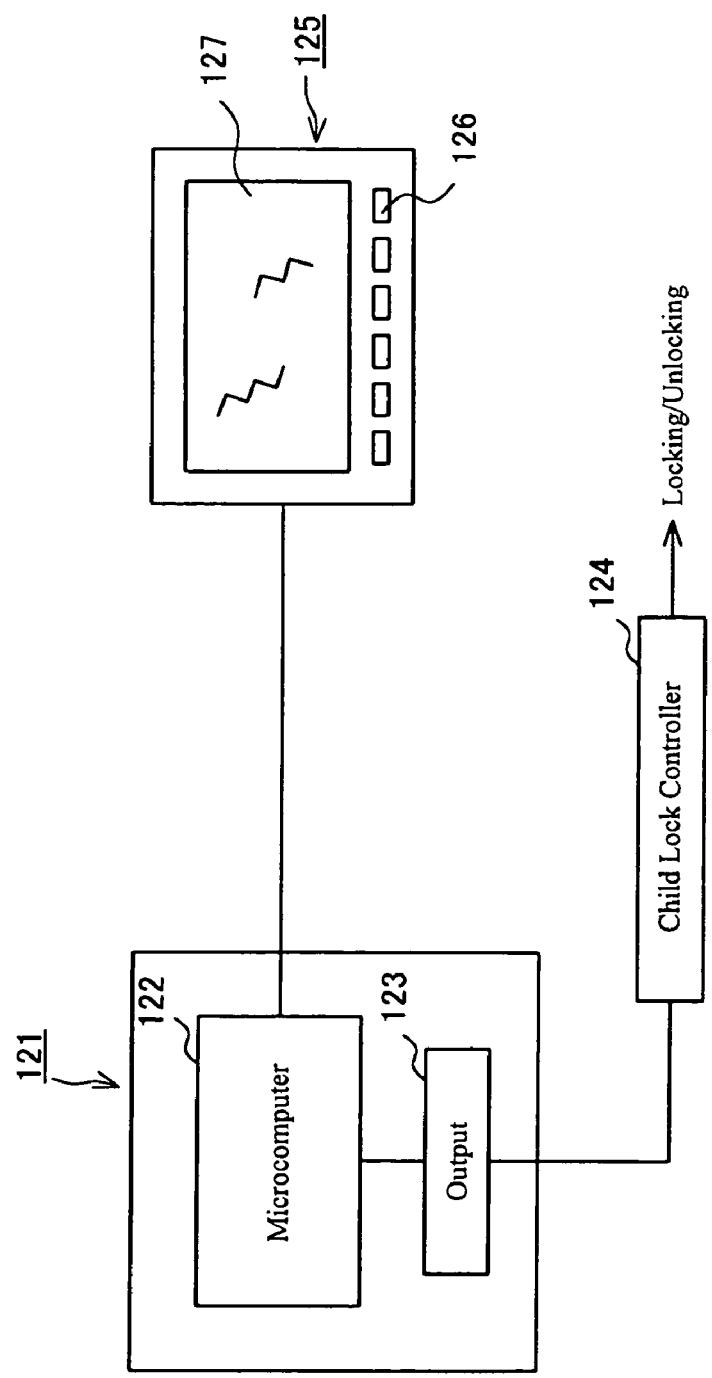
FIG. 24 is a block diagram schematically showing the principal part of a vehicle environment control system comprising a vehicle environment control device according to an eleventh embodiment.

FIG. 24 is a block diagram schematically showing the principal part of a vehicle environment control system comprising a vehicle environment control device according to an eleventh embodiment. Reference numeral 121 in the figure represents a vehicle environment control device, comprising a microcomputer 122 and an output processing section 123, to which a child lock controller 124 for controlling the switching of locking/unlocking of a child lock is connected.

Multimedia equipment 125 comprises a microcomputer (not shown), an inputting device 126, a display 127 having a touch panel function and associated parts, further having an audio function, a navigation function and the like. The microcomputer of the multimedia equipment 125 and the microcomputer 122 of the vehicle environment control device 121 are connected so that data can be exchanged therebetween.

Figure 25A:
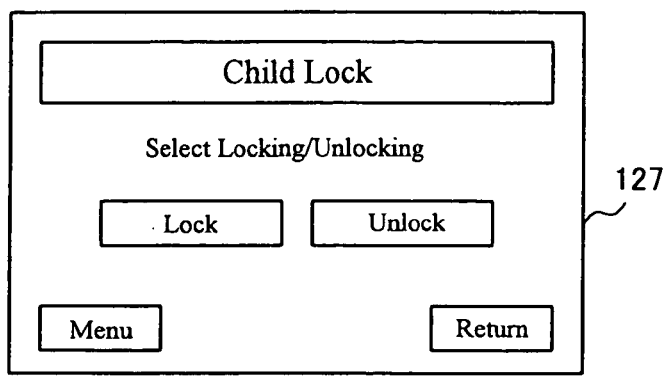
FIG. 25A is a diagram showing an example of an operating screen shown on a display of multimedia equipment constituting a vehicle environment control system.
Figure 25B:
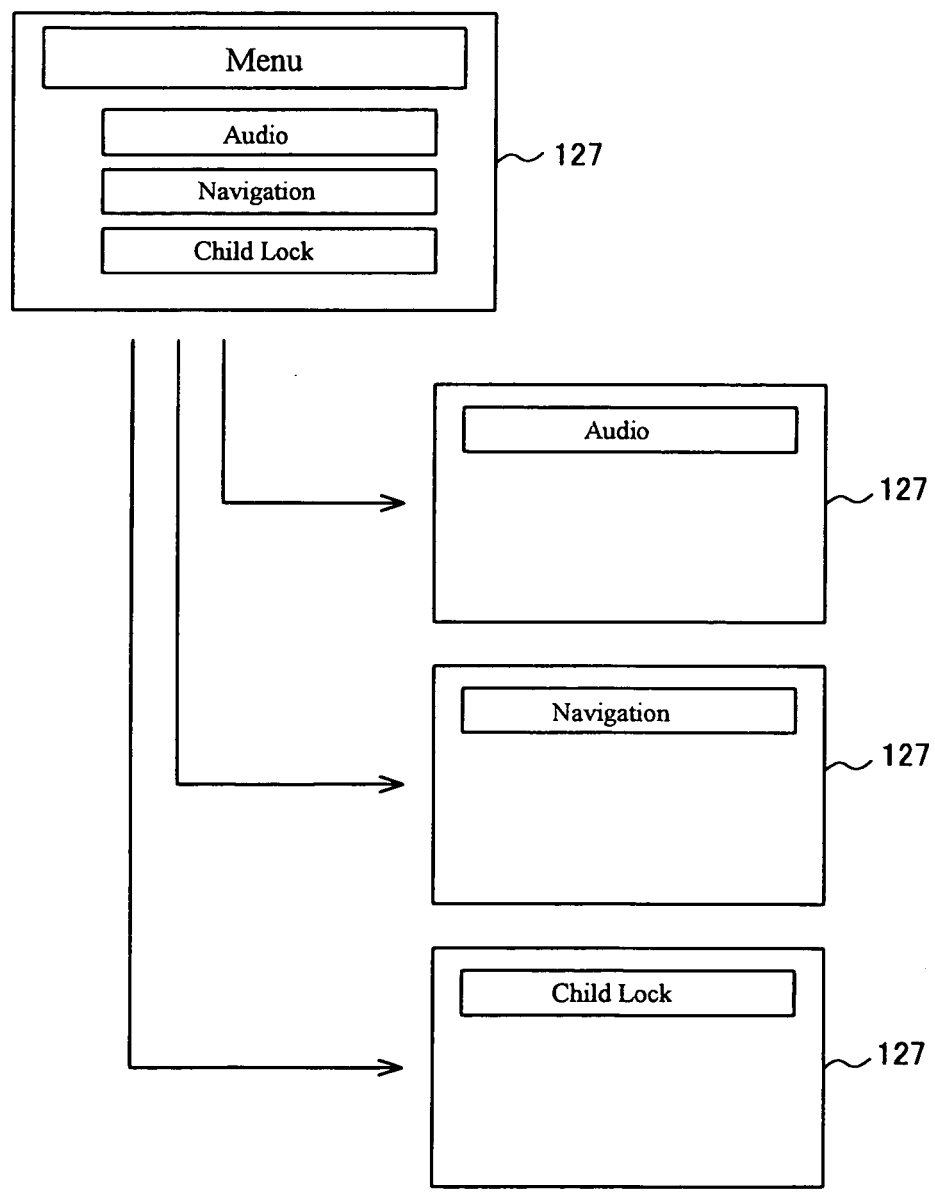
FIG. 25B is an illustration for showing the operating screen having a hierarchical structure.

On the display 127 of the multimedia equipment 125, an operating screen as shown in FIG. 25A can be shown. Through the operating screen, a user can provide an instruction to switch between locking and unlocking of the child lock. Here, the operating screen shown on the display 127 has a hierarchical structure as shown in FIG. 25B. And the multimedia equipment 125 transmits data showing the contents directed through the operating screen to the microcomputer 122 of the vehicle environment control device 121.

When receiving data transmitted from the multimedia equipment 125, the microcomputer 122 of the vehicle environment control device 121 controls the child lock controller 124 so as to lock the child lock in the case of judging that the user provided an instruction to lock the child lock based on the received data, while it controls the child lock controller 124 so as to unlock the child lock in the case of judging that the user provided an instruction to unlock the child lock.

Using the vehicle environment control device according to the above eleventh embodiment, by operating the display 127 (touch panel) mounted on the multimedia equipment 125, it is possible to instruct to switch between the locking and unlocking of the child lock, resulting in easy switching of the locking/unlocking of the child lock.

In addition, since the operating screen on the touch panel is changed (because it has a hierarchical structure or the like), the operation thereof is not difficult for adults (adults are rather accustomed to using that), but it is not so easy for children (particularly, for infants). Therefore, it is possible to prevent children from switching between the locking and unlocking of the child lock, not only convenience but also safety can be secured.

A vehicle environment control system according to a first reference example is described below. In the system, to a navigation system mounted on the vehicle M, information regarding a goal, information showing the conditions for calculating a guidance route to the goal and the like can be transmitted through radio communications (such as a telephone line), and the navigation system can calculate the guidance route to the goal based on the information transmitted from the outside sources. Therefore, the calculation of the guidance route can be completed before a driver gets on the vehicle M, resulting in a smooth departure without loss of time.

What is claimed is:

1. A vehicle environment control device for recognizing and controlling the state of vehicle-associated equipment and a vehicle environment, said vehicle environment control device comprising:
a personal data storage section for storing personal data of a user of the vehicle associated with the user;
a user identification section for identifying the user;
a personal data reading section for reading the personal data of the user of the vehicle from the personal data storage section based on the identification result by said user identification section;
a vehicle environment setting section for setting the vehicle to be an environment suitable for the identified user based on the personal data read by said personal data reading section; and
an antitheft unit for generating a state of inconvenience for driving the vehicle through the use of said vehicle environment setting section;
wherein the user is identified by said user identification section based on voice print information, face image information, or both of voice print information and face image information,
wherein the vehicle environment set by said vehicle environment setting section includes at least one from among the positions of a seat, a brake pedal, mirrors and a steering wheel, an expanding force of an air bag, a stiffness of a suspension, and a timing of shifting, and
wherein the state of inconvenience for driving the vehicle is generated when a determination is made by said user identification section that a person desiring to use the vehicle is not an authorized user of the vehicle.

* * * * *